（12） United States Patent
Lee et al.

(10) Patent No.: US 10,073,732 B2
(45) Date of Patent: Sep. 11, 2018

(54) OBJECT STORAGE SYSTEM MANAGING ERROR-CORRECTION-CODE-RELATED DATA IN KEY-VALUE MAPPING INFORMATION

(71) Applicant: Samsung Electronics Co., Ltd., Suwon-si, Gyeonggi-do (KR)

(72) Inventors: DuckJoo Lee, Suwon-si (KR); Yong-Taek Jeong, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 16 days.

(21) Appl. No.: 15/440,591

(22) Filed: Feb. 23, 2017

(65) Prior Publication Data

US 2017/0255508 A1 Sep. 7, 2017

Related U.S. Application Data

(60) Provisional application No. 62/303,467, filed on Mar. 4, 2016.

(30) Foreign Application Priority Data

May 31, 2016 (KR) .......................... 10-2016-0067563

(51) Int. Cl.
*G06F 11/10* (2006.01)

(52) U.S. Cl.
CPC ................................ *G06F 11/1016* (2013.01)

(58) Field of Classification Search
CPC ............. G06F 11/1016; G06F 11/1068; G06F 11/1072; G06F 3/06; G06F 3/0619; G06F 12/16; G11C 29/42; G11C 29/52
See application file for complete search history.

(56) References Cited

U.S. PATENT DOCUMENTS

| | | | |
|---|---|---|---|
| 7,451,380 B2 | 11/2008 | Carnevale et al. | |
| 7,634,708 B2 * | 12/2009 | Kark | G06F 12/1475 711/164 |
| 7,679,133 B2 | 3/2010 | Son et al. | |
| 8,185,778 B2 | 5/2012 | Kilzer et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,745,294 B2 | 6/2014 | Cho | |
| 8,924,638 B2 | 12/2014 | Carannante et al. | |
| 8,924,663 B2 | 12/2014 | Szczepkowski et al. | |

(Continued)

OTHER PUBLICATIONS

Yoon et al.," Virtualized and Flexible ECC for Main Memory," ACM, 2010.

*Primary Examiner* — Shelly A Chase
(74) *Attorney, Agent, or Firm* — Harness, Dickey & Pierce, P.L.C.

(57) ABSTRACT

An object storage system includes a plurality of memory devices; and a memory controller configured to, receive a value and a key from a host, the key identifying the received value, store data corresponding to the received value in the plurality of memory devices, generate, based on the received value, a parity for detecting an error of the stored data, manage key-value mapping information that identifies a correspondence relationship between the received value and the key, and manage the parity in the key-value mapping information such that the parity corresponds to the received value and the key.

20 Claims, 16 Drawing Sheets

(56) References Cited

U.S. PATENT DOCUMENTS

| | | |
|---|---|---|
| 9,075,710 B2 * | 7/2015 | Talagala .............. G06F 12/0246 |
| 2005/0138011 A1 | 6/2005 | Royer et al. |
| 2011/0233648 A1 | 9/2011 | Seol et al. |
| 2014/0229655 A1 | 8/2014 | Goss et al. |
| 2015/0249467 A1 * | 9/2015 | Nakanishi ............. G06F 21/602 |
| | | 714/800 |
| 2016/0041783 A1 * | 2/2016 | Choi ...................... G11C 29/52 |
| | | 711/103 |

* cited by examiner

OBJECT STORAGE SYSTEM MANAGING ERROR-CORRECTION-CODE-RELATED DATA IN KEY-VALUE MAPPING INFORMATION

CROSS-REFERENCE TO RELATED APPLICATIONS

The present application claims priority under 35 U.S.C. § 119 to U.S. Patent Provisional Application No. 62/303,467 filed on Mar. 4, 2016, in U.S. Patent and Trademark Office, and to Korean Patent Application No. 10-2016-0067563 filed on May 31, 2016, in Korean Intellectual Property Office, the entire contents of which are incorporated herein by reference.

TECHNICAL FIELD

At least some example embodiments relate to data storage, and more particularly, to a configuration and an operation of an object storage that stores data according to a key-value mapping scheme.

DESCRIPTION OF THE RELATED ART

Nowadays, various kinds of electronic devices are being used. Some electronic devices can store data and operate based on the stored data. To this end, some electronic devices include a storage device or a storage system to store data. Meanwhile, some electronic devices store or read data while communicating with an external storage device or system.

Storage devices or systems may be variously classified. For example, the storage devices or systems may be classified into a nonvolatile memory based storage and a volatile memory based storage. The nonvolatile memory based storage stores data regardless of power supply. Meanwhile, the volatile memory based storage loses data stored therein when it is not powered, but it operates faster than the nonvolatile memory based storage device.

For example, the storage devices or systems may be classified into a block storage, a file storage, and an object storage. The block storage manages data based on a physical location, and the file storage manages data based on a logical sequence. Meanwhile, the object storage manages data based on a unique identifier. The block storage and the file storage may be useful when the amount of text data is great, and the object storage may be efficient when the amount of unstructured data (e.g., sound data or video data) is great.

In recent years, consumers primarily consume the unstructured data by transmitting and receiving the unstructured data. Various technologies such as a cloud storage or a distributed file system are employed to efficiently manage and process the unstructured data. In addition, the storage device or system employs various error check/correction schemes based on an error correction code (ECC) to improve data reliability.

SUMMARY

At least some example embodiments of the inventive concepts may provide configurations and operations of an object storage. According to at least some example embodiments of the inventive concepts, the object storage may manage ECC-related data (e.g., a parity, metadata for ECC, and/or the like) in key-value mapping information. According to at least some example embodiments of the inventive concepts, the object storage may add dummy data to data corresponding to a value, to align a size of the data corresponding to the value.

According to at least some example embodiments of the inventive concepts, an object storage system includes a plurality of memory devices; and a memory controller configured to, receive a value and a key from a host, the key identifying the received value, store data corresponding to the received value in the plurality of memory devices, generate, based on the received value, a parity for detecting an error of the stored data, manage key-value mapping information that identifies a correspondence relationship between the received value and the key, and manage the parity in the key-value mapping information such that the parity corresponds to the received value and the key.

According to at least some example embodiments of the inventive concepts, an object storage system includes a plurality of memory devices configured to store data that corresponds to a value; and a memory controller configured to, manage key-value mapping information that identifies a correspondence relationship between the value, a first key and a parity, receive a key from the host, determine the received key corresponds to the first key, based on the determination, read, from the plurality of memory devices, the data that corresponds to the value that is identified by the key-value mapping information as having the correspondence relationship with the first key, and output the value to the host based on the read data, wherein the memory controller is further configured to detect an error of the read data based on the parity that is identified by the key-value mapping information as having the correspondence relationship with the value and the key.

According to at least some example embodiments of the inventive concepts, an object storage system includes a plurality of memory devices; and a memory controller configured to, receive a value, metadata of the value, and a key from a host, the key identifying the received value, and manage key-value mapping information that identifies a correspondence relationship between the received value, the key and the metadata, wherein the memory controller is further configured to, determine a size of the value based on the metadata, and generate modified data by adding dummy data to the value, when the size of the value is smaller than an ECC unit size of the memory controller.

According to at least some example embodiments of the inventive concepts, a memory system includes one or more memory devices; and a memory controller configured to, generate a table that, includes a first key identifying value data, includes a storage address of the value data within the one or more memory devices, includes parity data for performing error detection on the value data, and maps the first key to the storage address and the parity data, receive a key from a host, and when the received key corresponds to the first key, read the value data from the one or more memory devices using the storage address, perform error detection on the read value data using the parity data, and output the read value data to the host.

BRIEF DESCRIPTION OF THE DRAWINGS

The above and other features and advantages will become apparent from the following description with reference to the following figures, wherein like reference numerals refer to like parts throughout the various figures unless otherwise specified, and wherein.

DETAILED DESCRIPTION OF EXAMPLE EMBODIMENTS

Figure 1:
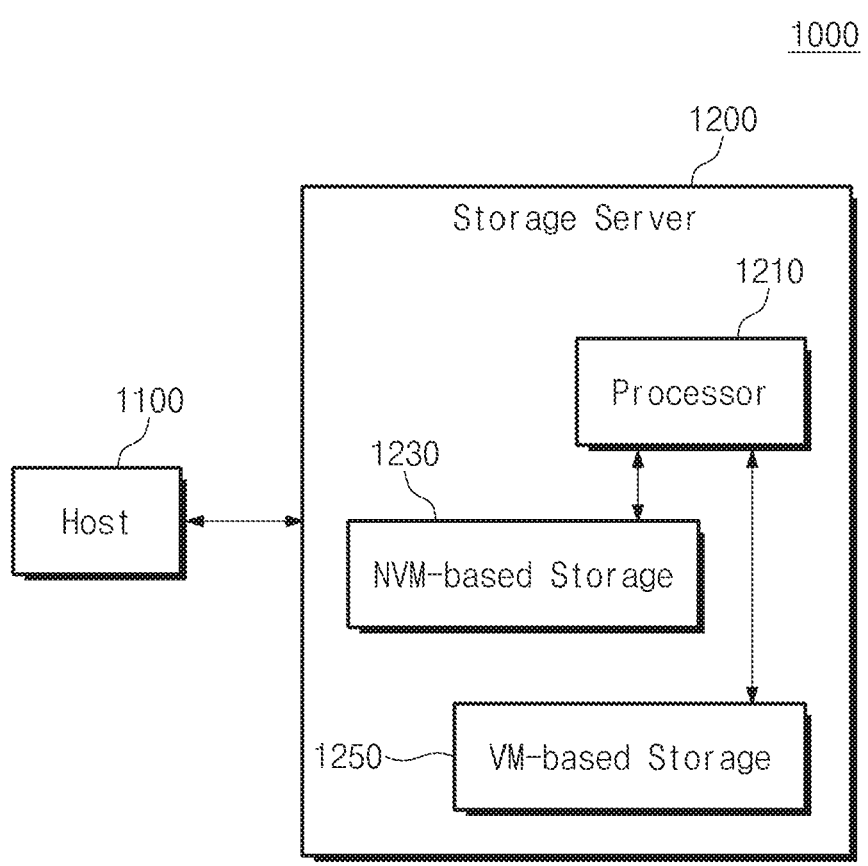
FIG. 1 is a block diagram illustrating an example configuration of an electronic system that includes a server employing an object storage according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts. At least some example embodiments of the inventive concepts will now be more fully described with reference to accompanying drawings so that those skilled in the art can readily comprehend the inventive concepts.

FIG. 1 is a block diagram illustrating an example configuration of an electronic system that includes a server employing object storage according to at least some example embodiments of the inventive concepts. Referring to FIG. 1, an electronic system 1000 may include a host 1100 and a storage server 1200.

The host 1100 may provide a service to a user of the host 1100 according to operations of various electronic circuits/chips/devices included in the host 1100. For example, the host 1100 may perform various operations to process a command received from the user of the host 1100, and may provide operation results to the user of the host 1100. To this end, for example, the host 1100 may include an operation processor (e.g., a central processing unit (CPU), a graphic processing unit (GPU), an application processor (AP), and/or the like) including a special-purpose logic circuit (e.g., field programmable gate arrays (FPGA), application specific integrated circuits (ASICs), and/or the like). According to at least some example embodiments of the inventive concepts, the host 1100 may be or include, for example, a microprocessor, multiprocessor, or multi-core processor configured to execute instructions included in program code stored in storage of the host 1100.

According to at least some example embodiments of the inventive concepts, the host 1100 may be an electronic device that is separate from the storage server 1200. For example, the host 1100 may be one of various user devices, such as a mobile communication terminal, a desktop computer, a laptop computer, a tablet computer, a smart phone, a wearable device, and/or the like. Alternatively, the host 1100 may be a workstation, another server, or a vehicle. In the above-described examples, the electronic system 1000 may be implemented to include a plurality of electronic devices (e.g., the host 1100 and the storage server 1200) that communicate with each other.

According to at least some example embodiments of the inventive concepts, the electronic system 1000 may be implemented in a single device. For example, the host 1100 may be the operation processor itself. The configurations of the electronic system 1000 and the host 1100 may be variously changed or modified.

The storage server 1200 may store data for the host 1100. The storage server 1200 may output data stored therein in response to a request from the host 1100. For example, the host 1100 may operate as a client of the storage server 1200. The host 1100 may communicate with the storage server 1200 to store or read data in or from the storage device 1200.

According to at least some example embodiments of the inventive concepts, the storage server 1200 may include a processor 1210, a nonvolatile memory-based storage 1230, and a volatile memory-based storage 1250. The processor 1210 may perform various operations to control overall operations of the storage server 1200. For example, the processor 1210 may include a special-purpose logic circuit (e.g., FPGA, ASICs, and/or the like) configured to perform various arithmetic operations and/or logical operations. The processor 1210 may manage and control operations of the nonvolatile memory-based storage 1230 and the volatile memory-based storage 1250 in response to a request from the host 1100. According to at least some example embodiments of the inventive concepts, the processor 1210 may be, for example, a microprocessor, multiprocessor, or multi-core processor configured to execute instructions included in program code stored in storage of the storage server 1200.

Each of the nonvolatile memory-based storage 1230 and the volatile memory-based storage 1250 may store data, and may output the stored data. The nonvolatile memory-based storage 1230 may store data regardless of whether it is powered or not. For example, the nonvolatile memory-based storage 1230 may include any storage such as, but is not limited thereto, a hard disk drive (HDD) mechanically operating, a solid state drive (SSD) including a semiconductor flash memory, and/or the like.

On the other hand, the volatile memory-based storage 1250 may lose data stored therein when not powered. However, the volatile memory-based storage 1250 may operate faster than the nonvolatile memory-based storage 1230. For example, the volatile memory-based storage 1250 may include any volatile memory, examples of which include, but are not limited to, a dynamic random access memory (DRAM), a synchronous DRAM (SDRAM), and/or the like. For example, when the volatile memory-based storage 1250 includes a DRAM, the volatile memory-based storage 1250 may be implemented based on a dual in-line memory module (DIMM) scheme.

The storage server 1200 may store data that is required to be retained regardless of power supply, in the nonvolatile memory-based storage 1230. For example, an original version of data having a high importance may be stored in the nonvolatile memory-based storage 1230. For example, before power supply to the volatile memory-based storage 1250 is interrupted, data stored in the volatile memory-based storage 1250 may be flushed into the nonvolatile memory-based storage 1230.

The storage server 1200 may store data that is frequently accessed, in the volatile memory-based storage 1250. For example, when the storage server 1200 is a content server for storing contents (e.g., music, videos, and/or the like) consumed by a consumer, data of the contents may be frequently accessed. To improve data output performance, the data of the contents may be stored in the volatile memory-based storage 1250 that can operate at a high speed.

However, at least some example embodiments of the inventive concepts are not limited to the above examples. The nonvolatile memory-based storage 1230 may be variously employed to improve safety of retaining data; on the other hand, the volatile memory-based storage 1250 may be variously employed to improve speed of processing data.

According to at least some example embodiments of the inventive concepts, the storage server 1200 may be implemented in a single device with the host 1100. According to at least some example embodiments of the inventive concepts, the electronic system 1000 may be implemented in an electronic device (e.g., a user device, a computer, and/or the like) including the host 1100 and the storage server 1200.

According to at least some example embodiments of the inventive concepts, the storage server 1200 may be implemented in a separate electronic device from the host 1100. The storage server 1200 may be implemented in a server device or system (e.g., a rack server, a blade server, a micro-server, and/or the like) to provide a storage service for the host 1100.

According to at least some example embodiments of the inventive concepts, the storage server 1200 may be implemented in a plurality of computing devices. For example, the processor 1210, the nonvolatile memory-based storage 1230, and the volatile memory-based storage 1250 may be implemented in separate computing devices respectively. In at least such example embodiments of the inventive concepts, the storage server 1200 may employ a distributed file system. In this case, a computing device performing functions of the processor 1210 may operate as a master node, and computing devices performing functions of the nonvolatile memory-based storage 1230 and the volatile memory-based storage 1250 may operate as slave nodes.

However, at least some example embodiments of the inventive concepts are not limited to the above examples. The configuration of the storage server 1200 may be variously changed or modified to provide the storage service for the host 1100. FIG. 1 illustrates an example in which the electronic system 1000 includes one host 1100, one storage server 1200, one processor 1210, one nonvolatile memory-based storage 1230, and one volatile memory-based storage 1250. However, the number of each of the components included in the electronic system 1000 may be variously changed or modified.

According to at least some example embodiments of the inventive concepts, at least one of the nonvolatile memory-based storage 1230 and/or the volatile memory-based storage 1250 may include object storage. Unlike block storage or file storage, the object storage may manage data based on a unique identifier of an object.

For example, the object storage may receive specific data and a "key" corresponding to the specific data from the host 1100. The key may be used to uniquely identify the specific data. For example, when the object storage receives a key together with a read request from the host 1100, the object storage may output data corresponding to the received key, to the host 1100. Such operations of the object storage will be more fully described with reference to FIG. 2.

When the amount of unstructured data (e.g., sound data, video data, and/or the like) is great, the object storage may manage such data more efficiently than the block storage or the file storage, due to a characteristic of the object storage. Accordingly, when the storage server 1200 is a content server employing the object storage, the storage server 1200 may manage data associated with contents efficiently and may process a read request from the host 1100 at a high speed.

According to at least some example embodiments of the inventive concepts, the volatile memory-based storage 1250 may include the object storage. According to at least some example embodiments of the inventive concepts, the volatile memory-based storage 1250 may process frequently accessed data at a high speed, and may manage such data efficiently.

Below, it will be assumed that the volatile memory-based storage 1250 includes the object storage. In addition, the volatile memory-based storage 1250 may be referred to as the object storage. However, these assumption and description are intended to facilitate better understanding, and at least some example embodiments of the inventive concepts are not limited thereto. In at least some other example embodiments of the inventive concepts, the volatile memory-based storage 1250 may include other type(s) of storage(s), and/or the nonvolatile memory-based storage 1230 may employ at least some example embodiments of the inventive concepts to be described below.

Figure 2:
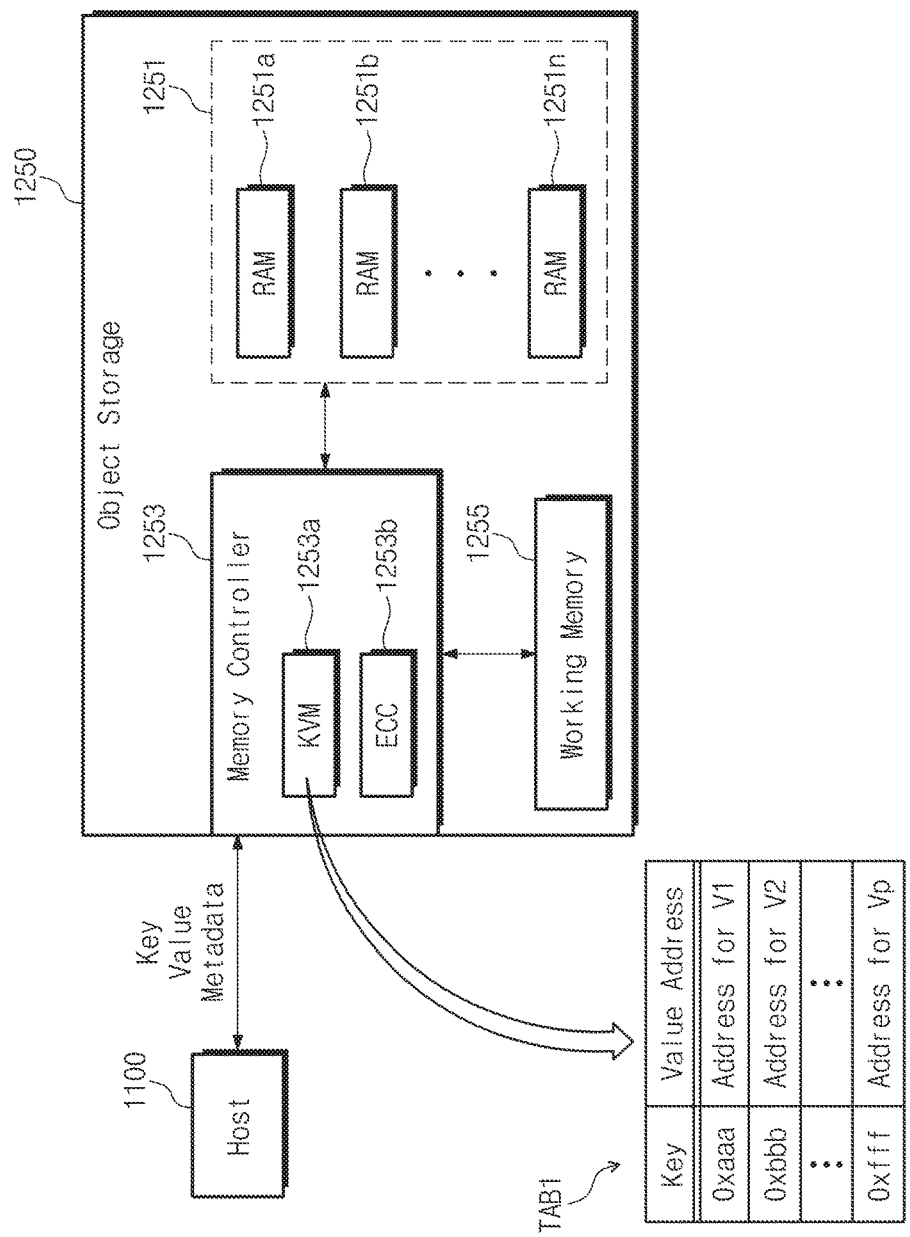
FIG. 2 is a block diagram illustrating an example configuration of an object storage according to at least some example embodiments of the inventive concepts.

FIG. 2 is a block diagram illustrating an example configuration of an object storage according to at least some example embodiments of the inventive concepts. Referring to FIG. 2, an object storage 1250 may include a memory block 1251 and a memory controller 1253.

The memory block 1251 may include a plurality of memory devices. For example, as assumed above, the object storage 1250 may be a volatile memory-based storage. In this example, the memory block 1251 may include a plurality of RAM devices 1251*a*, 1251*b*, and 1251*n*. The RAM devices 1251*a*, 1251*b*, and 1251*n* may be implemented in separate memory devices (e.g., memory chips or memory packages). For example, each of the RAM devices 1251*a*, 1251*b*, and 1251*n* may include a DRAM chip or an SDRAM chip.

The memory controller 1253 may control overall operations of the object storage 1250. The memory controller 1253 may perform various arithmetic operations and/or logical operations to control operations of the object storage 1250. To this end, the memory controller 1253 may include various analog circuits and/or logical circuits. In addition, for computations, the memory controller 1253 may include a processor including a special-purpose logic circuit (e.g., FPGA, ASICs, and/or the like). According to at least some example embodiments of the inventive concepts, the processor of the memory controller 1253 may be, for example, a microprocessor, multiprocessor, or multi-core processor configured to execute instructions included in program code stored in storage of the object storage 1250.

The memory controller 1253 may control the RAM devices 1251*a*, 1251*b*, and 1251*n* to store or output data. For example, when the memory controller 1253 receives a write request from the host 1100, the RAM devices 1251*a*, 1251*b*, and 1251*n* may store write-requested data under control of the memory controller 1253. For example, when the memory controller 1253 receives a read request from the host 1100, the RAM devices 1251*a*, 1251*b*, and 1251*n* may output read-requested data under control of the memory controller 1253.

For example, the object storage 1250 may exchange a "key", a "value", and "metadata" with the host 1100 through the memory controller 1253. To this end, the memory controller 1253 may include a transmitter/receiver circuit and an interface processing circuit.

The value may correspond to data to be stored in the object storage 1250 in response to a write request of the host 1100. The key may be used to uniquely identify the value. The metadata may include information associated with the value (e.g., a size of data corresponding to the value, a time point when the value is created, and/or the like).

For example, when the object storage 1250 receives a key together with a read request from the host 1100, the object storage 1250 may provide the host 1100 with a value corresponding to the received key. To this end, the object storage 1250 may manage "key-value mapping information" associated with a correspondence relationship between values and keys.

For example, the key-value mapping information may be managed in the form of a table. For example, FIG. 2 illustrates a key-value mapping table TAB1 including key-value mapping information. This example is intended to facilitate better understanding, and at least some example embodiments of the inventive concepts are not limited thereto. The form for managing the key-value mapping information may be variously changed or modified.

For example, when the host 1100 intends to store a value V1 in the object storage 1250, the host 1100 may provide the object storage 1250 with the value V1 and a key 0xaaa corresponding to the value V1. The object storage 1250 may store data corresponding to the value V1 in the memory block 1251. The object storage 1250 may store an address of a memory area that stores the data corresponding to the value V1, and the key 0xaaa, in the key-value mapping table TAB1. The key-value mapping table TAB1 may be managed such that the key 0xaaa corresponds to the address of the memory area storing the data corresponding to the value V1.

For example, when the host 1100 intends to read the value V1 from the object storage 1250, the host 1100 may provide the object storage 1250 with the key 0xaaa corresponding to the value V1. The object storage 1250 may recognize the address of the memory area storing the data corresponding to the value V1, based on the key 0xaaa of the key-value mapping table TAB1. The object storage 1250 may read the data corresponding to the value V1 from the recognized address of the memory block 1251. The object storage 1250 may output the value V1 to the host 1100 based on the read data. Accordingly, the object storage 1250 may read and output the value V1 corresponding to the key 0xaaa.

In the above-described manner, the key-value mapping table TAB1 may be managed such that a key 0xbbb corresponds to an address of a memory area storing data corresponding to a value V2 and a key 0xfff corresponds to an address of a memory area storing data corresponding to a value Vp. The object storage 1250 may manage the key-value mapping table TAB1 such that one value corresponds to one key. The host 1100 may manage keys that respectively correspond to values stored in the object storage 1250 by itself.

To manage the key-value mapping information, the memory controller 1253 may include a key-value mapping manager 1253*a*. The key-value mapping manager 1253*a* may manage the correspondence relationship between values and keys. For example, the key-value mapping manager 1253*a* may operate such that a key received from the host 1100 corresponds to an address of a memory area storing data corresponding to a value. Accordingly, the key-value mapping manager 1253 may create key-value mapping information.

The key-value mapping manager 1253*a* may include one or more analog circuits and/or logic circuits to perform the above-described functions and functions to be described below. Alternatively or additionally, the key-value mapping manager 1253*a* may be implemented by a processor configured to execute program code including instructions corresponding to the above-described functions and functions to be described below. For example, the processor of the memory controller 1253 may embody the key-value mapping manager 1253*a* by executing program code including instructions corresponding to the operations described herein as being performed by the key-value mapping manager 1253*a*. In some cases, the key-value mapping manager 1253*a* may be implemented in a hybrid form of hardware and software.

According to at least some example embodiments of the inventive concepts, the key-value mapping information may be stored in the memory block 1251. According to at least some example embodiments of the inventive concepts, the key-value mapping information may be stored in a cache memory (not illustrated) of the memory controller 1253. However, at least some example embodiments of the inventive concepts are not limited thereto. The key-value mapping information may be stored in any memory area that is accessible by the memory controller 1253.

The memory controller 1253 may include an error correction code (ECC) processor 1253*b*. The ECC processor 1253*b* may check and correct an error of data read from the memory block 1251. To this end, the ECC processor 1253*b* may employ various error correction schemes, such as a Read-Solomon (RS) code, a hamming code, a Bose-Chaudhuri-Hocquenghem (BCH) code, a low density parity check (LDPC) code, and/or the like.

For example, the ECC processor 1253*b* may perform ECC encoding on data corresponding to a value received from the host 1100. The ECC processor 1253*b* may generate a parity by performing the ECC encoding. The parity may be used to detect and/or correct an error of data read from the memory block 1251.

For example, the ECC processor 1253*b* may perform ECC decoding on data read from the memory block 1251. The ECC processor 1253*b* may perform ECC decoding with reference to the parity generated through the ECC encoding. The ECC processor 1253*b* may check and correct an error of the read data based on the ECC decoding result.

The ECC processor 1253*b* may include one or more analog circuits and/or logic circuits to perform the above-described functions and functions to be described below. Alternatively or additionally, the ECC processor 1253*b* may be implemented by the processor of the memory controller 1253 executing program code that includes instructions corresponding to the operations described herein as being performed by the ECC processor 1253*b*. In some cases, the ECC processor 1253*b* may be implemented in a hybrid form of hardware and software (i.e., a processor executing program code).

The ECC processor 1253*b* may generate ECC-related data (e.g., a parity, metadata for ECC, and/or the like) during the ECC encoding, and may refer to the ECC-related data for the ECC decoding. The object storage 1250 may store the ECC-related data for the ECC processor 1253*b*. The object storage 1250 may prepare a space for storing the ECC-related data, which will be described in detail with reference to FIGS. 3 and 4.

In some cases, the object storage 1250 may store data of contents consumed by a consumer. To improve satisfaction of the consumer and reliability of data, the ECC processor 1253*b* may check and/or correct an error of data. ECC operations may be readily understood by those skilled in the art, thus detailed descriptions thereof will be omitted below.

According to at least some example embodiments of the inventive concepts, the object storage 1250 may further include a working memory 1255. The working memory 1255 may temporarily store data processed or to be processed by the memory controller 1253. For example, the working memory 1255 may store key-value mapping information that is generated by the key-value mapping manager 1253*a*. For example, the working memory 1255 may include rapidly accessible memories, example of which include, but are not limited to, a static RAM (SRAM), a DRAM, an SRAM, a phase change RAM (PRAM), a magneto-resistive RAM (MRAM), a resistive RAM (ReRAM), a ferroelectric RAM (FRAM), and/or the like.

Figure 3:
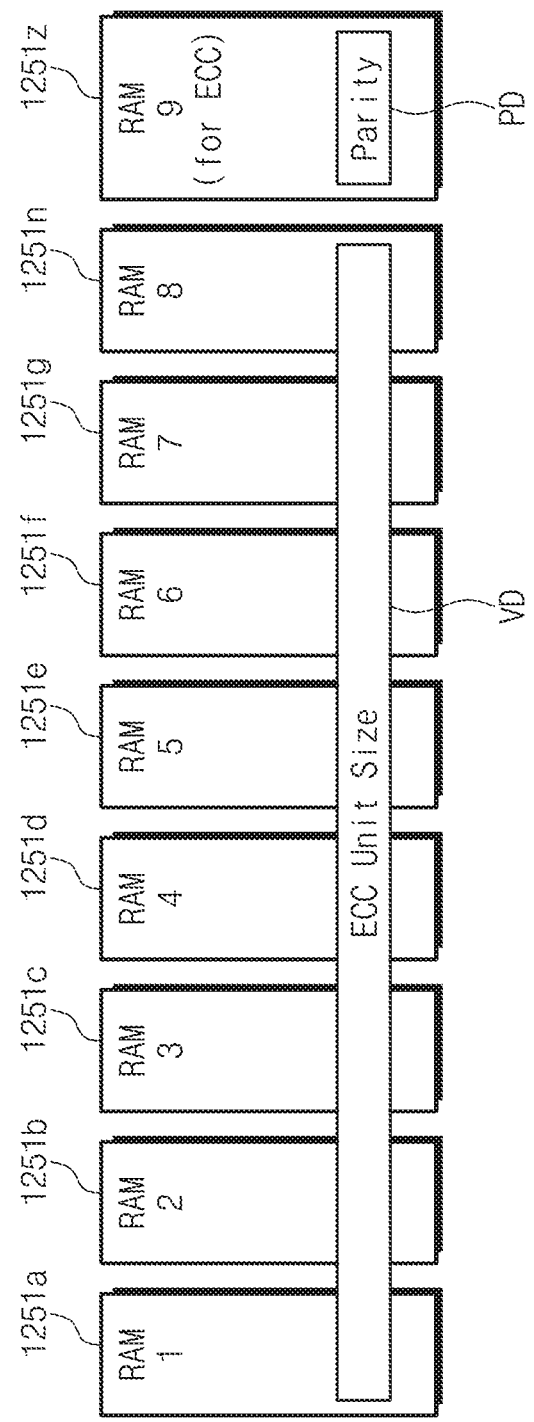
FIG. 3 is a conceptual diagram illustrating an example configuration for managing a parity in a memory device of the object storage of FIG. 2.

FIG. 3 is a conceptual diagram illustrating an example configuration for managing a parity in a memory device of the object storage of FIG. 2. To facilitate better understanding, FIG. 3 will be referred together with FIG. 2.

As described with reference to FIG. 2, the object storage 1250 may include the memory block 1251. As an example of memory devices included in the memory block 1251, nine RAM devices 1251*a*, 1251*b*, 1251*c*, 1251*d*, 1251*e*, 1251*f*, 1251*g*, 1251*n*, and 1251*z* are illustrated in FIG. 3.

As described with reference to FIG. 2, the object storage 1250 may receive a value from the host 1100 through the memory controller 1253. The RAM devices 1251*a*, 1251*b*, 1251*c*, 1251*d*, 1251*e*, 1251*f*, 1251*g*, and 1251*n* may store data (hereinafter referred to as 'value data VD') corresponding to the received value.

The RAM devices 1251*a*, 1251*b*, 1251*c*, 1251*d*, 1251*e*, 1251*f*, 1251*g*, and 1251*n* may store the value data VD in an ECC unit. The ECC unit may be a processing unit that is a target of ECC encoding and ECC decoding performed by the ECC processor 1253*b*. In other words, the ECC processor 1253*b* may perform the ECC encoding and the ECC decoding on data having a size of the ECC unit of the memory controller 1253. To improve efficiency of the ECC processing (e.g., encoding, decoding, and/or the like), the value data VD may have the size of the ECC unit.

The ECC processor 1253*b* may generate a parity PD by performing the ECC encoding on the value data VD. The RAM device 1251*z* may store the parity PD corresponding to the value data VD. The parity PD may be used to detect and/or correct of the value data VD when the value data VD is read from the memory block 1251. The ECC processor 1253*b* may perform the ECC decoding on the read value data VD based on the parity PD.

As described with reference to FIG. 2, the object storage 1250 may prepare a space for storing the ECC-related data. In the example configuration of FIG. 3, the RAM device 1251*z* may be used as the space for storing the ECC-related data (e.g., the parity PD). For example, the RAM device 1251*z* may store only the parity PD and information (e.g., metadata for ECC) that is used together with the parity PD to detect and/or correct an error of the value data VD.

According to the example configuration of FIG. 3, the memory block 1251 may include the additional RAM device 1251*z* for ECC as well as the RAM devices 1251*a*, 1251*b*, 1251*c*, 1251*d*, 1251*e*, 1251*f*, 1251*g*, and 1251*n* for storing the value data VD. For example, when the object storage 1250 employs a DRAM, the RAM device 1251*z* may be additionally required because the DRAM does not include any spare memory area.

However, according to the example configuration of FIG. 3, an area occupied by the memory block 1251 may increase due to the additional RAM device 1251*z*. In addition, data granularity may be degraded because the parity PD is managed on the memory block 1251 together with the value data VD. Furthermore, the memory controller 1253 further includes circuit logic for combining and dividing the value data VD and the parity PD, thus an area occupied by the memory controller 1253 may also increase.

Figure 4:
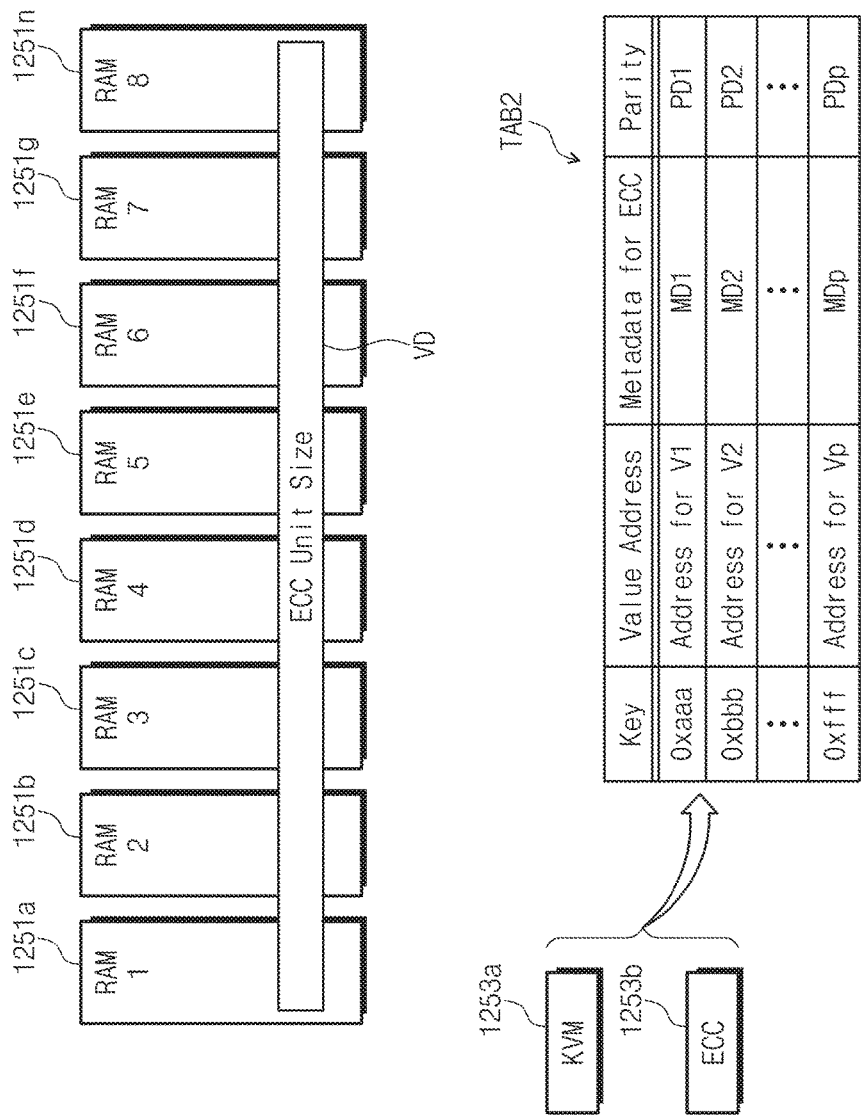
FIG. 4 is a conceptual diagram illustrating an example configuration for managing a parity in key-value mapping information of the object storage of FIG. 2.

FIG. 4 is a conceptual diagram illustrating an example configuration for managing a parity in key-value mapping information of the object storage of FIG. 2. To facilitate better understanding, FIG. 4 will be referred together with FIG. 2.

As described with reference to FIG. 2, the object storage 1250 may include the memory block 1251. As an example of memory devices included in the memory block 1251, eight RAM devices 1251*a*, 1251*b*, 1251*c*, 1251*d*, 1251*e*, 1251*f*, 1251*g*, and 1251*n* are illustrated in FIG. 4.

As described with reference to FIG. 2, the object storage 1250 may receive a value from the host 1100 through the memory controller 1253. The RAM devices 1251a, 1251b, 1251c, 1251d, 1251e, 1251f, 1251g, and 1251n may store value data VD. Similarly to the example configuration of FIG. 3, the RAM devices 1251a, 1251b, 1251c, 1251d, 1251e, 1251f, 1251g, and 1251n may store the value data VD in an ECC unit.

The ECC processor 1253b may generate a parity PD by performing ECC encoding on the value data VD. As described with reference to FIG. 2, the object storage 1250 may prepare a space for storing the ECC-related data. In the example configuration of FIG. 4, the parity generated by the ECC processor 1253b may be managed in the key-value mapping information.

As described with reference to FIG. 2, the key-value mapping manager 1253a may manage the key-value mapping information that is associated with a correspondence relationship between values and keys. For example, the key-value mapping information may be managed in the form of a table, and FIG. 4 illustrates a key-value mapping table TAB2 including the key-value mapping information. However, as described with reference to FIG. 2, the form for managing the key-value mapping information may be variously changed or modified.

In the example configuration of FIG. 4, the key-value mapping table TAB2 may further include information associated with the parity and metadata (e.g., metadata that the ECC processor 1253b may refer to) as well as information associated with the correspondence relationship between keys and values.

According to at least some example embodiments of the inventive concepts, the key-value mapping table TAB2 may manage parities and metadata such that the parities and the metadata correspond to values and keys. To manage parities and metadata in the key-value mapping table TAB2, the ECC processor 1253b may directly access the key-value mapping table TAB2. Alternatively or additionally, the ECC processor 1253b may communicate with the key-value mapping manager 1253a, and may insert a parity and metadata into the key-value mapping table TAB2 through the key-value mapping manager 1253a.

For example, the key-value mapping table TAB2 may be managed such that the key 0xaaa corresponds to the address of the memory area storing the data corresponding to the value V1. In addition, in the key-value mapping table TAB2, a parity PD1 and metadata MD1 for the value V1 may correspond to the key 0xaaa and the address of the memory area storing the data corresponding to the value V1.

For example, the object storage 1250 may receive the key 0xaaa and the value V1 from the host 1100 through the memory controller 1253. Data corresponding to the value V1 may be stored in the memory block 1251, and the key-value mapping manager 1253a may manage the key 0axxx and the address of the memory area storing the data corresponding to the value V1, in the key-value mapping table TAB2.

In addition, the ECC processor 1253b may generate the parity PD1 by performing the ECC encoding on the data corresponding to the value V1. The parity PD1 and the metadata MD1 may be managed in the key-value mapping table TAB2. The metadata MD1 may be provided from the host 1100, and may include information associated with the value V1 (e.g., a size of data corresponding to the value V1, a time point when the value V1 is generated, and/or the like).

For example, the object storage 1250 may receive a read request of the value V1 together with the key 0xaaa from the host 1100 through the memory controller 1253. The memory controller 1253 may recognize the address of the memory area storing the data corresponding to the value V1, based on the key 0xaaa of the key-value mapping table TAB2. The memory controller 1253 may read the data corresponding to the value V1 from the memory area of the recognized address.

In addition, the ECC processor 1253b may perform the ECC decoding on the read data corresponding to the value V1, based on the parity PD1 and the metadata MD1 stored in the key-value mapping table TAB2. The ECC processor 1253b may check and/or correct an error of the read data, based on the ECC decoding result. The memory controller 1253 may output the value V1 to the host 1100, based on the data checked and/or corrected by the ECC processor 1253b.

In the above-described manner, the key-value mapping table TAB2 may be managed such that the key 0xbbb corresponds to the address of the memory area storing data corresponding to the value V2. In addition, in the key-value mapping table TAB2, a parity PD2 and metadata MD2 for the value V2 may correspond to the key 0xbbb and the address of the memory area storing the data corresponding to the value V2.

Similarly, the key-value mapping table TAB2 may be managed such that the key 0xfff corresponds to the address of the memory area storing data corresponding to the value Vp. In addition, in the key-value mapping table TAB2, a parity PDp and metadata MDp for the value Vp may correspond to the key 0xfff and the address of the memory area storing the data corresponding to the value Vp.

According to the example configuration of FIG. 4, the parity PD1, PD2, or PDp may be stored and managed independently of the value data VD. Accordingly, in comparison to the memory block 1251 having the example configuration of FIG. 3, the memory block 1251 having the example configuration of FIG. 4 may not include an additional RAM device (e.g., 1251z) for ECC. Thus, an area occupied by the memory block 1251 may decrease.

In addition, the parities PD1, PD2, and PDp may be managed and stored independently of the value data VD, thus it may be possible to secure data granularity and manage data efficiently. Furthermore, the memory controller 1253 does not include circuit logic for combining and dividing the value data VD and the parity PD1, PD2, or PDp, thus it may be possible to reduce an area occupied by the memory controller 1253 and improve performance of operation. Since the sizes of the memory block 1251 and the memory controller 1253 decrease and additional devices/circuits are omitted, costs of manufacturing the object storage 1250 may decrease.

Figure 5:
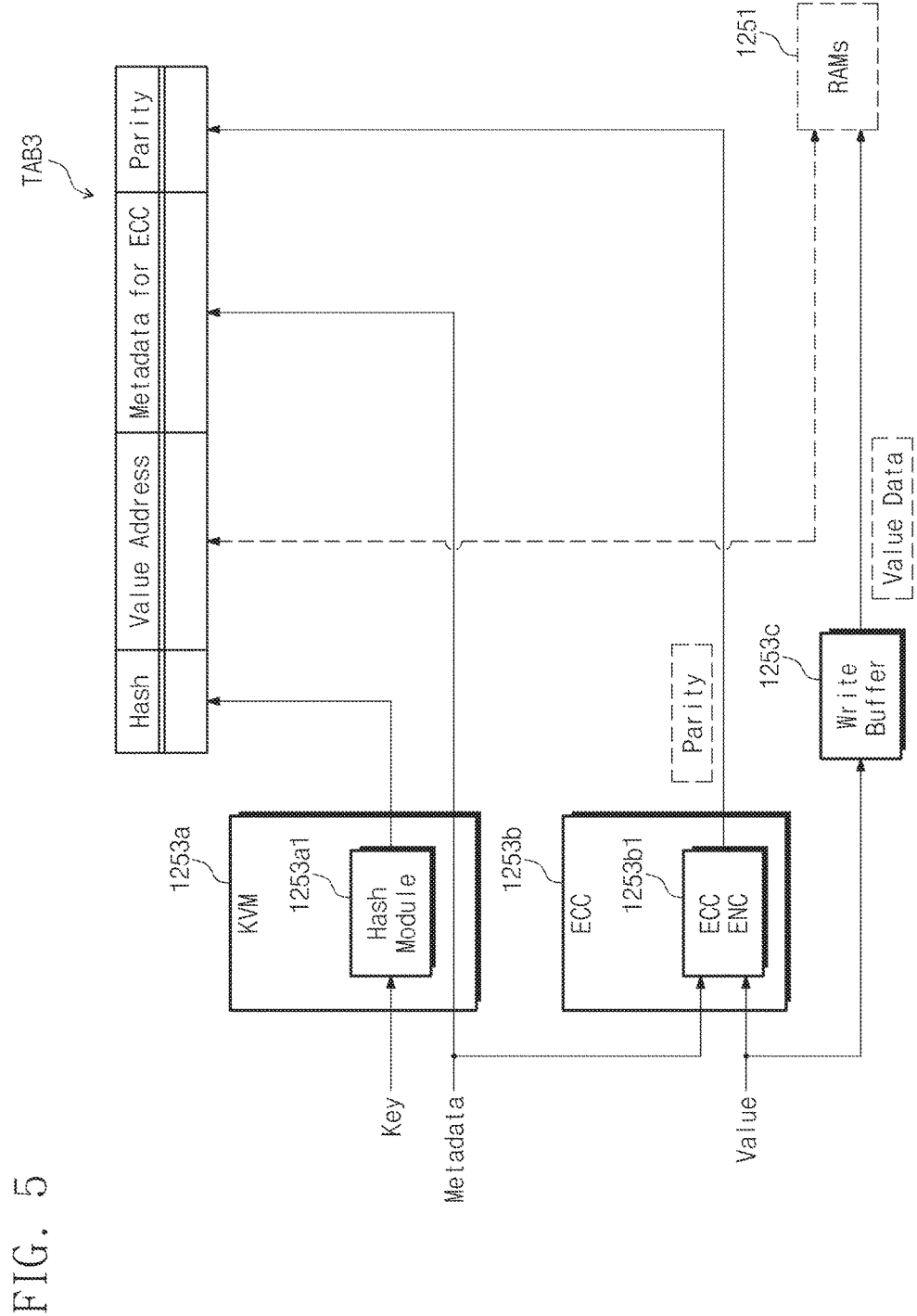
FIG. 5 is a conceptual diagram illustrating an example configuration of a memory controller of FIG. 2 for storing a parity in the key-value mapping information according to the example configuration of FIG. 4.

FIG. 5 is a conceptual diagram illustrating an example configuration of the memory controller of FIG. 2 for storing parity in key-value mapping information according to the example configuration of FIG. 4. To facilitate better understanding, FIG. 5 will be referred together with FIG. 2.

As described above, the object storage 1250 may exchange a key, a value, and metadata with the host 1100 through the memory controller 1253. According to at least some example embodiments of the inventive concepts, the memory controller 1253 may include the key-value mapping manager 1253a and the ECC processor 1253b to process the key, the value, and the metadata.

The key-value mapping processor 1253a may manage key-value mapping information that is associated with a correspondence relationship between values and keys. For example, the key-value mapping information may be managed in the form of a table, and FIG. 5 illustrates a key-value mapping table TAB3 including the key-value mapping information. However, as described with reference to FIG. 2, the form for managing the key-value mapping information may be variously changed or modified.

The key-value mapping manager 1253a may receive a key from the host 1100. Referring to the key-value mapping tables TAB1 and TAB2 illustrated in FIGS. 2 and 4, the key-value mapping manager 1253a may manage the received key itself in the key-value mapping information. Meanwhile, according to at least some example embodiments of the inventive concepts, the key-value mapping manager 1253a may transform the received key and may manage the transformed key in the key-value mapping information.

According to at least some example embodiments of the inventive concepts, the key-value mapping manager 1253a may include a hash module 1253a1. The hash module 1253a1 may perform a hash operation on the received key. The hash module 1253a1 may generate a hash as the result of the hash operation. The hash may be included in key-value mapping information as data corresponding to the received key.

For example, the hash operation may be performed to transform a specific value into a value that has a shorter length (or size) than the specific value. The hash module 1253a1 may be employed to decrease a length (or size) of the received key. Accordingly, in comparison to storing the received key itself, employing the hash module 1253a1 may make it possible to shorten latency occurring when key-value mapping information is accessed.

For example, the key-value mapping manager 1253a may store a hash (in some cases, may store a key itself) in a hash field of the key-value mapping table TAB3. For example, the key-value mapping manager 1253a may store metadata provided from the host 1100 in a metadata field of the key-value mapping table TAB3. In some cases, the key-value mapping manager 1253a may extract metadata, which will be used by the ECC processor 1253b, from the provided metadata and may manage the extracted metadata in the key-value mapping table TAB3.

The ECC processor 1253b may receive a value from the host 1100. The ECC processor 1253b may include an ECC encoding block 1253b1 that may perform ECC encoding on the received value. In some cases, the ECC processor 1253b may receive metadata from the host 1100. For example, the ECC encoding block 1253b1 may perform the ECC encoding on the received value with reference to the metadata. The ECC processor 1253b may generate a parity as the ECC encoding result.

As described with reference to FIG. 4, the parity may be managed in the key-value mapping information (e.g., the key-value mapping table TAB3). For example, the parity may be stored in a parity field of the key-value mapping table TAB3. Herein, as described with reference to FIG. 4, the parity may be included in the key-value mapping information such that the parity corresponds to the hash and the value.

The ECC processor 1253b may directly access the key-value mapping information to manage the parity in the key-value mapping information. Alternatively or additionally, the ECC processor 1253b may communicate with the key-value mapping manager 1253a and may manage the parity in the key-value mapping information through the key-value mapping manager 1253a.

According to at least some example embodiments of the inventive concepts, the memory controller 1253 may include a write buffer 1253c. The value provided from the host 1100 may be stored in memory devices of the memory block 1251. The write buffer 1253c may temporarily buffer the value provided from the host 1100. Afterwards, value data corresponding to the buffered value may be stored in memory devices of the memory block 1251.

When the value data is stored in the memory block 1251, the memory controller 1253 may manage an address of a memory area that stores the value data, in the key-value mapping information. For example, the address may be stored in an address field of the key-value mapping table TAB3. Herein, the address may be included in the key-value mapping information such that the address corresponds to the key received from the host 1100 (or the hash) together with the value of the data stored at the address.

According to at least some example embodiments of the inventive concepts described with reference to FIG. 5, the key-value mapping information may include information associated with the correspondence relationship between a key, a value, metadata, and a parity. For example, the key-value mapping table TAB3 may indicate the correspondence relationship between a hash, an address of a memory area storing value data, metadata, and a parity.

When the key-value mapping table TAB3 is employed, the parity may be managed in the key-value mapping table TAB3 and the value data may be stored in the memory block 1251. Accordingly, the parity may be stored separately from the value data. According to at least such example embodiments of the inventive concepts, as described with reference to FIG. 4, costs of manufacturing the object storage 1250 may decrease, and data may be efficiently managed. In addition, the operation performance of the object storage 1250 may be improved.

Figure 6:
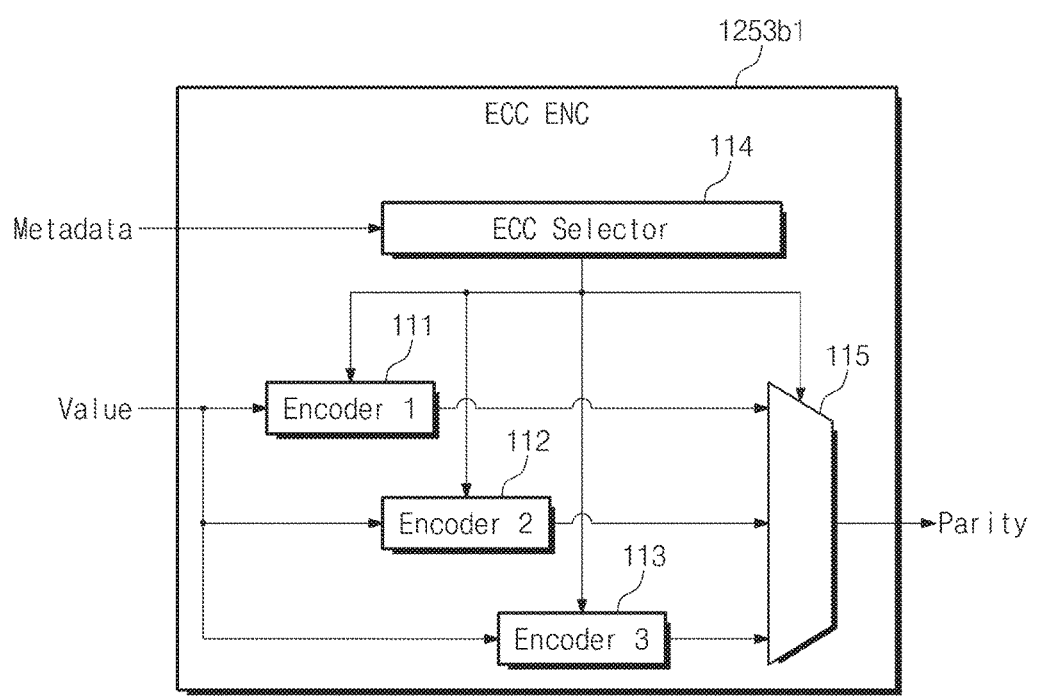
FIG. 6 is a block diagram illustrating an example configuration of an error correction code (ECC) encoding block of FIG. 5.

FIG. 6 is a block diagram illustrating an example configuration of the ECC encoding block of FIG. 5. To facilitate better understanding, FIG. 6 will be referred together with FIG. 2.

The ECC encoding block 1253b1 may receive a value and metadata from the host 1100. The ECC encoding block 1253b1 may perform ECC encoding on the received value with reference to the metadata. The ECC encoding block 1253b1 may generate a parity as the ECC encoding result.

According to at least some example embodiments of the inventive concepts, the ECC encoding block 1253b1 may include only one ECC encoder. In at least some other example embodiments of the inventive concepts, the ECC encoding block 1253b1 may include a plurality of ECC encoders 111, 112, and 113, as illustrated in FIG. 6.

Each of the ECC encoders 111, 112, and 113 may be configured to perform ECC encoding on the value. According to at least some example embodiments of the inventive concepts, the ECC encoders 111, 112, and 113 may have different error check/correction capabilities. For example, the ECC encoder 111 may be associated with a 1-bit error, and the ECC encoder 112 and the ECC encoder 113 may be associated with a 2-bit error and a 3-bit error respectively.

According to at least some example embodiments of the inventive concepts, different error correction schemes may be employed by the ECC encoders 111, 112, and 113. For example, each of the ECC encoders 111 and 112 may employ a BCH code scheme, and the ECC encoder 113 may employ an LDPC code scheme. For example, some of the ECC encoders 111, 112, and 113 may generate only hard-decision information, but the remaining ECC encoders may also generate soft-decision information.

The ECC encoding block 1253b1 may further include an ECC selector 114 and an output selector 115. The ECC selector 114 may selectively operate one of the ECC encoders 111, 112, and 113 with reference to the metadata provided from the host 1100.

As described above, the metadata may include information associated with the value. For example, the ECC selector 114 may determine the size of value data based on the metadata. Herein, the data size may mean a quantitative measure associated with the amount of data, such as a length of a data bit string, a capacity of data, and the like. The ECC selector 114 may select an ECC encoder that has an error check/correction capability corresponding to the determined size, from among the ECC encoders 111, 112, and 113.

Alternatively or additionally, the ECC selector 114 may determine an attribute, a type, and/or importance of the value, based on the metadata. The ECC selector 114 may select an ECC encoder that employs an error correction scheme corresponding to the determined result, from among the ECC encoders 111, 112, and 113. For example, when the value importance is high or when it is expected that a value includes many errors, an ECC encoder having a higher error correction capability or an ECC encoder generating soft-decision information may be selected.

The ECC encoder selected from the ECC encoders 111, 112, and 113 may generate a parity by performing ECC encoding on the value. The parity generated by the selected ECC encoder may be output through the output selector 115. The ECC selector 114 may control the output selector 115 such that the parity is output from the selected ECC encoder. For example, the output selector 115 may include a multiplexer circuit.

According to the example configuration illustrated in FIG. 6, ECC encoding suitable for the value may be performed. Accordingly, flexibility and efficiency of the ECC encoding may be improved. In some cases, speed of the ECC encoding may become faster, and power consumption in the ECC encoding may decrease.

FIG. 6 is illustrates an example in which the ECC encoding block 1253*b*1 includes three ECC encoders 111, 112, and 113. However, at least some example embodiments of the inventive concepts are not limited thereto, and the number of ECC encoders included in the ECC encoding block 1253*b*1 may be variously changed or modified.

Figure 7:
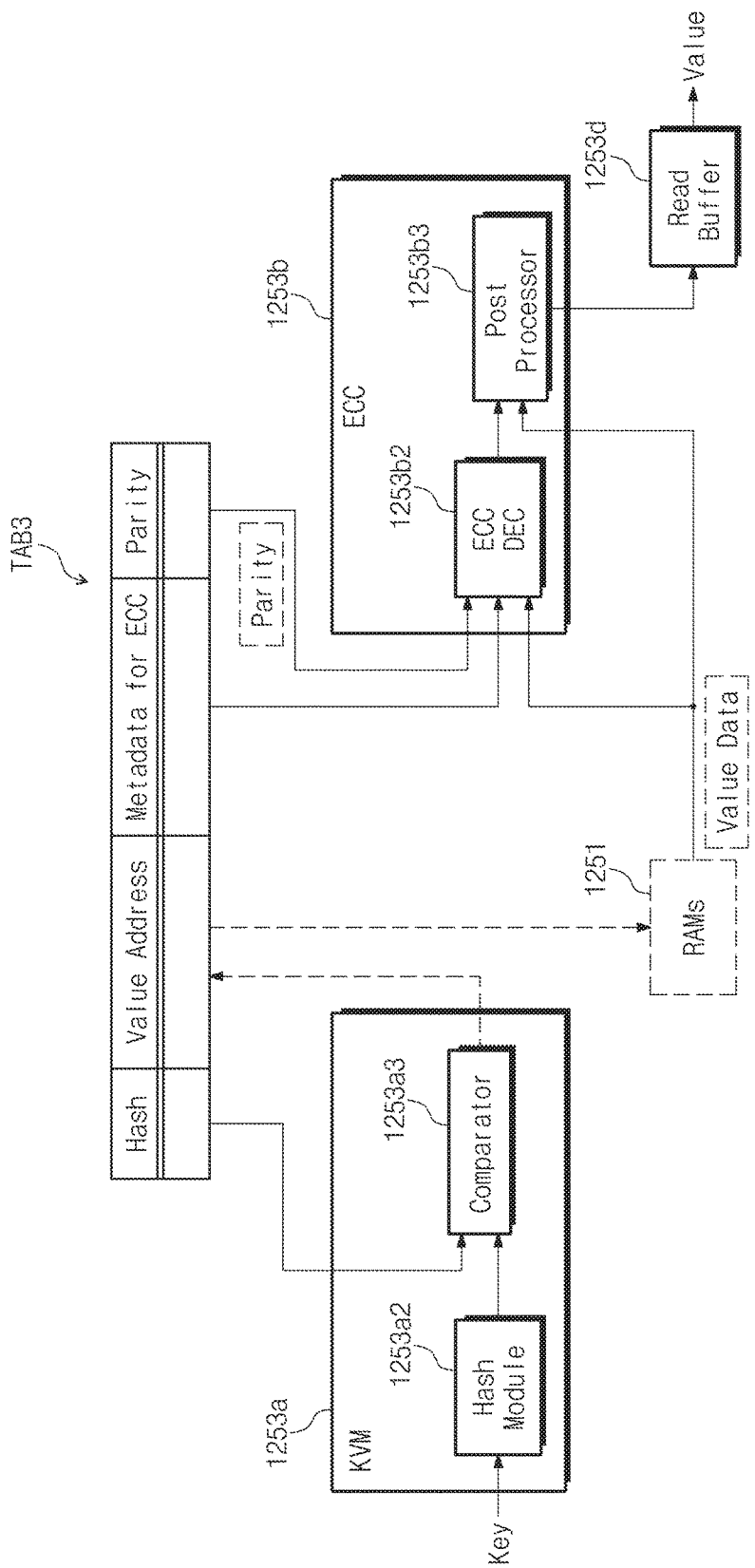
FIG. 7 is a conceptual diagram illustrating an example configuration of the memory controller of FIG. 2 for referring to a parity stored in the key-value mapping information according to the example configuration of FIG. 4.

FIG. 7 is a conceptual diagram illustrating an example configuration of the memory controller of FIG. 2 for referring to a parity stored in key-value mapping information according to the example configuration of FIG. 4. To facilitate better understanding, FIG. 7 will be referred together with FIG. 2.

In some cases, the object storage 1250 may receive a read request of a value from the host 1100 through the memory controller 1253. The memory controller 1253 may receive a key from the host 1100 together with the read request.

The key-value mapping manager 1253*a* included in the memory controller 1253 may receive a key from the host 1100. A hash module 1253*a*2 of the key-value mapping manager 1253*a* may perform a hash operation on the received key. The hash module 1253*a*2 may be implemented in one component with the hash module 1253*a*1 of FIG. 5, or may be separately from the hash module 1253*a*1 of FIG. 5.

The key-value mapping manager 1253*a* may include a comparator 1253*a*3. The comparator 1253*a*3 may compare a hash generated by the hash module 1253*a*2 with one or more hashes stored in the key-value mapping table TAB3. The comparator 1253*a*3 may output the comparison result.

A hash which is the same as the hash generated by the hash module 1253*a*2 from among the hashes in the key-value mapping table TAB3 may correspond to a read-requested value. The memory controller 1253 may refer to the key-value mapping table TAB3 based on the output of the comparator 1253*a*3. The memory controller 1253 may recognize an address of a memory area storing data corresponding to the read-requested value, with reference to the key-value mapping table TAB3. The memory controller 1253 may access the memory area of the memory block 1251 of the recognized address. Value data stored in the accessed memory area may be read under control of the memory controller 1253.

The ECC processor 1253*b* included in the memory controller 1253 may receive the value data read from the memory block 1251. In addition, the ECC processor 1253*b* may receive metadata and a parity stored in the key-value mapping table TAB3.

The ECC processor 1253*b* may include an ECC decoding block 1253*b*2 that may perform ECC decoding on the value data read from the memory block 1251. The ECC decoding block 1253*b*2 may perform ECC decoding on the value data based on the parity stored in the key-value mapping table TAB3. In some cases, the ECC decoding block 1253*b*2 may further refer to the metadata stored in the key-value mapping table TAB3 to perform the ECC decoding and detect and/or correct an error of the value data.

The ECC processor 1253*b* may directly access key-value mapping information to receive the parity and the metadata managed in the key-value mapping information. Alternatively or additionally, the ECC processor 1253*b* may communicate with the key-value mapping manager 1253*a* and may receive the parity and the metadata through the key-value mapping manager 1253*a*.

The ECC processor 1253*b* may include a post processor 1253*b*3. The post processor 1253*b*3 may process the value data based on the ECC decoding result of the ECC decoding block 1253*b*2. For example, when the ECC decoding result indicates that an error exists in the value data read from the memory block 1251, the post processor 1253*b*3 may correct the error. For example, the post processor 1253*b*3 may search for a reliable copy of the value data (e.g., from the nonvolatile memory-based storage 1230 of FIG. 1). The post processor 1253*b*3 may perform various operations required to output the read-requested value.

According to at least some example embodiments of the inventive concepts, the memory controller 1253 may include a read buffer 1253*d*. The read buffer 1253*d* may temporarily buffer the value data output from the ECC processor 1253*b*. Afterwards, the memory controller 1253 may output the read-requested value to the host 1100 based on the buffered value data in the read buffer 1253*d*.

Figure 8:
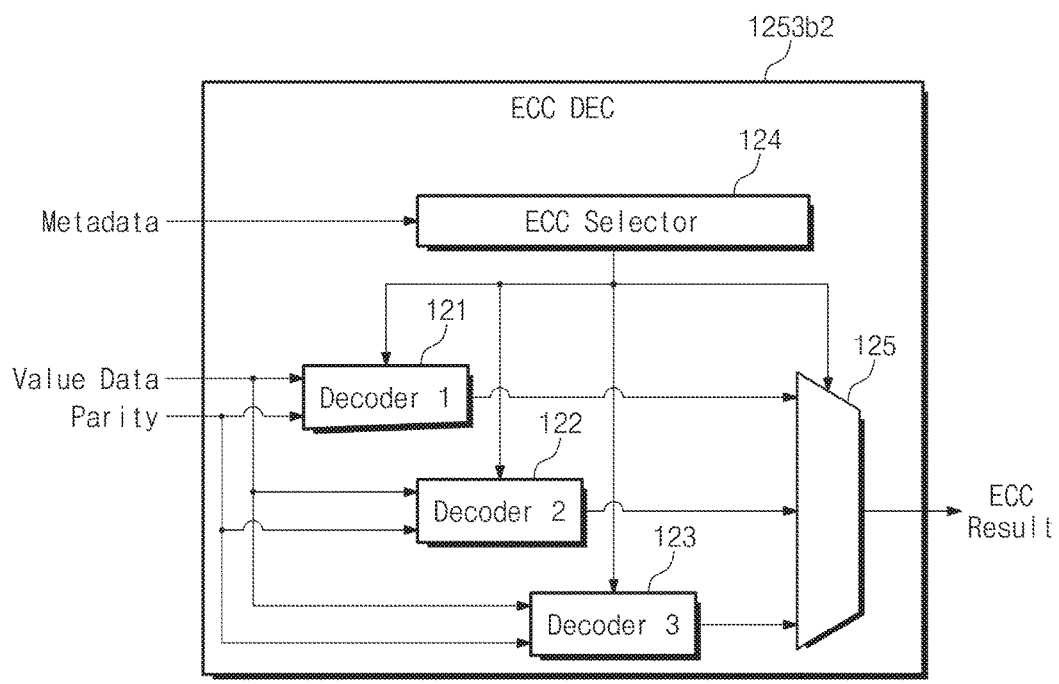
FIG. 8 is a block diagram illustrating an example configuration of an ECC decoder of FIG. 7.

FIG. 8 is a block diagram illustrating an example configuration of the ECC decoder of FIG. 7. To facilitate better understanding, FIG. 8 will be referred together with FIG. 2.

The ECC decoding block 1253*b*2 may receive value data read from the memory block 1251. In addition, the ECC decoding block 1253*b*2 may receive a parity and metadata managed in key-value mapping information. The ECC encoding block 1253*b*2 may perform ECC decoding on the value data, based on the parity and the metadata. The ECC decoding block 1253*b*2 may output the ECC decoding result.

According to at least some example embodiments of the inventive concepts, the ECC decoding block 1253*b*2 may include only one ECC decoder. In at least some other example embodiments of the inventive concepts, the ECC decoding block 1253*b*2 may include a plurality of ECC decoders 121, 122, and 123, as illustrated in FIG. 8.

Each of the ECC decoders 121, 122, and 123 may be configured to perform ECC decoding on value data. According to at least some example embodiments of the inventive concepts, the ECC decoders 121, 122, and 123 may have different error check/correction capabilities. For example, the ECC decoder 121 may correct a 1-bit error, and the ECC decoder 122 and the ECC decoder 123 may correct a 2-bit error and a 3-bit error respectively.

According to at least some example embodiments of the inventive concepts, different error correction schemes may be employed by the ECC decoders 121, 122, and 123. For example, each of the ECC decoders 121 and 122 may employ a BCH code scheme, and the ECC decoder 123 may employ an LDPC code scheme. For example, some of the ECC decoders 121, 122, and 123 may process only hard-decision information, but the remaining ECC decoders may also process soft-decision information.

The ECC decoding block 1253*b*2 may further include an ECC selector 124 and an output selector 125. The ECC selector 124 may selectively operate one of the ECC decoders 121, 122, and 123 with reference to the metadata managed in the key-value mapping information. The ECC selector 124 may refer to metadata corresponding to value data processed by the ECC decoding block 1253*b*2.

For example, the ECC selector 124 may determine the size of the value data based on the metadata. The ECC selector 124 may select an ECC decoder that has an error check/correction capability corresponding to the determined size from among the ECC decoders 121, 122, and 123.

Alternatively or additionally, the ECC selector 124 may determine an attribute, a type, and/or importance of the value data, based on the metadata. The ECC selector 124 may select an ECC decoder that employs an error correction scheme corresponding to the determined result, from among the ECC decoders 121, 122, and 123. Herein, when the importance is high or when it is expected that a value includes many errors, an ECC decoder having a higher error correction capability or an ECC decoder generating soft-decision information may be selected.

The ECC decoder selected from the ECC decoders 121, 122, and 123 may perform ECC decoding on value data based on the parity. The selected ECC decoder may check (in some cases, may further correct) an error of the value data and may output the ECC decoding result. The selected ECC decoder may output the ECC decoding result through the output selector 125. The ECC selector 124 may control the output selector 125 such that the selected ECC decoder outputs the ECC decoding result. For example, the output selector 125 may include a multiplexer circuit.

According to the example configuration illustrated in FIG. 8, ECC decoding suitable for value data may be performed. Accordingly, flexibility and efficiency of the ECC decoding may be improved. In some cases, speed of the ECC decoding may become faster, and power consumption in the ECC decoding may decrease.

FIG. 8 is illustrates an example in which the ECC decoding block 1253*b*2 includes three ECC decoders 121, 122, and 123. However, at least some example embodiments of the inventive concepts are not limited thereto, and the number of ECC decoders included in the ECC decoding block 1253*b*2 may be variously changed or modified.

Figure 9:
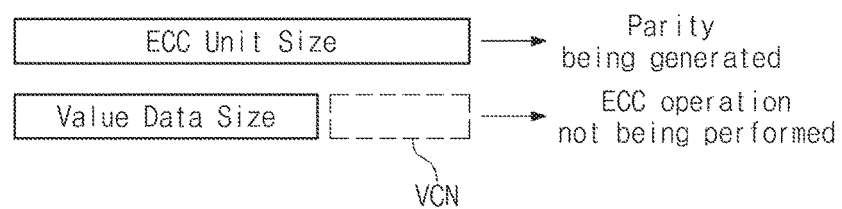
FIG. 9 is a conceptual diagram for describing a relationship between a size of value data and an ECC unit size of the memory controller of FIG. 2.

FIG. 9 is a conceptual diagram for describing a relationship between a size of value data and an ECC unit size of the memory controller of FIG. 2. To facilitate better understanding, FIG. 9 will be referred together with FIG. 2.

The ECC processor 1253*b* of the memory controller 1253 may perform ECC encoding and ECC decoding on data having the ECC unit size. Value data stored in memory devices of the memory block 1251 may have the ECC unit size. The ECC processor 1253*b* may generate a parity by performing the ECC encoding on value data having the ECC unit size.

However, in some cases, the memory controller 1253 may receive a value that does not have the ECC unit size, from the host 1100. For example, the memory controller 1253 may receive a value the size of which is smaller than the ECC unit size. For example, the host 1100 may be configured to store a value having a small size in the object storage 1250. In this case, for example, a difference as much as a vacancy VCN may occur between the ECC unit size and the size of value data.

When the difference occurs, the ECC processor 1253*b* may not perform an ECC operation (e.g., ECC encoding and/or ECC decoding) on the value the size of which is smaller than the ECC unit size. Accordingly, the memory controller 1253 may align a value size to the ECC unit size, to perform the ECC operation on the value of the small size. Aligning a data size will be described with reference to FIGS. 10 and 11.

Figure 10:
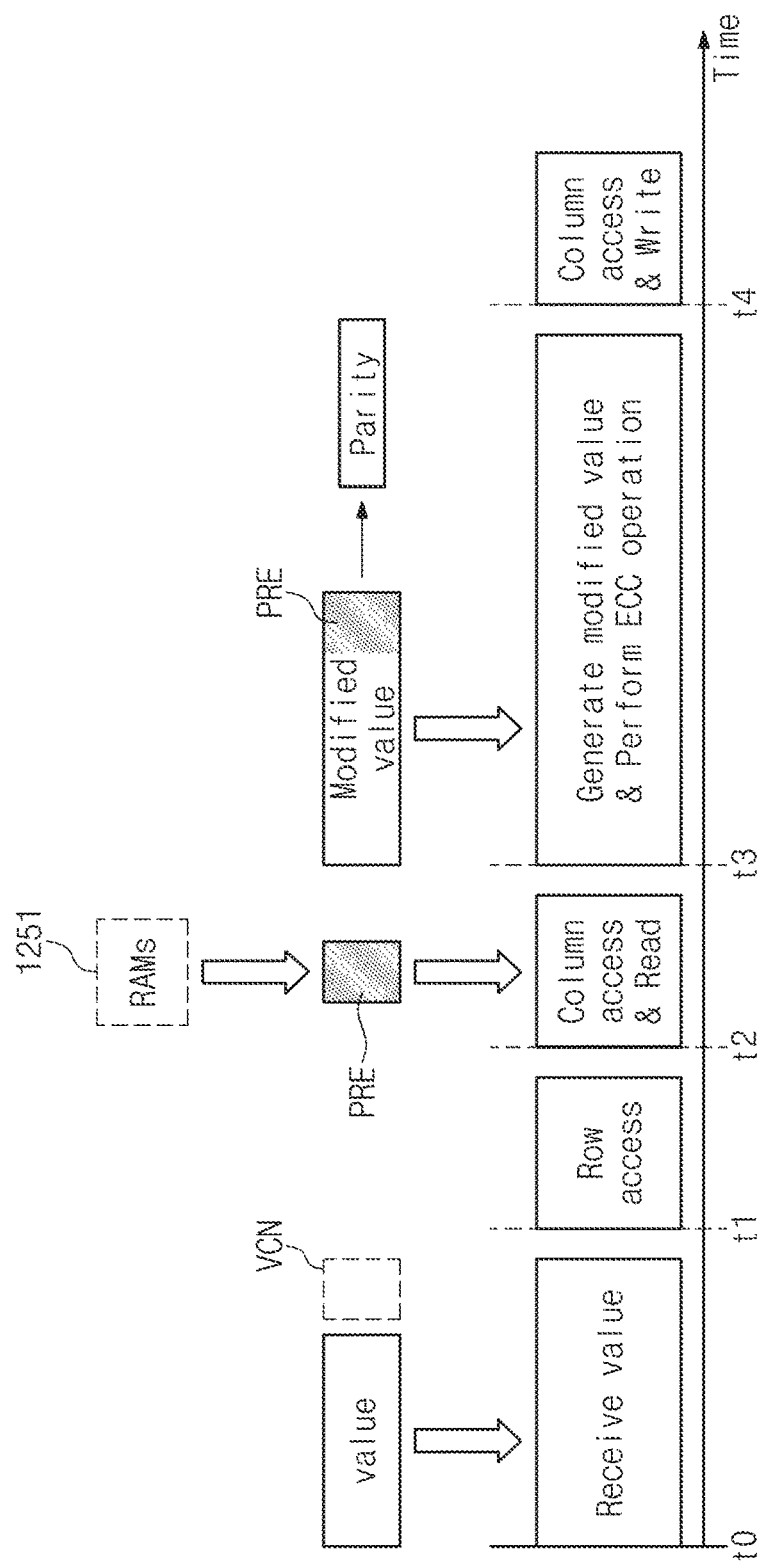
FIG. 10 is a conceptual diagram describing a read-modify-write operation that may be performed in the object storage of FIG. 2.

FIG. 10 is a conceptual diagram describing a read-modify-write operation that may be performed in the object storage of FIG. 2. To facilitate better understanding, FIG. 10 will be referred together with FIG. 2. In addition, it will be assumed below that the object storage 1250 employs a DRAM.

At time t0, the memory controller 1253 may receive a value from the host 1100. For example, a size of the received value may be smaller than the ECC unit size. For example, a difference as much as a vacancy VCN may occur between the ECC unit size and the value size.

At time t1, the memory controller 1253 may transmit a row access signal (e.g., a row access strobe (RAS) command) to a specific memory device included in the memory block 1251. In addition, at time t2, the memory controller 1253 may transmit a column access signal (e.g., a column access strobe (CAS) command) and a read request signal (e.g., a read command) to the specific memory device.

Accordingly, the memory controller 1253 may control the specific memory device such that data stored in the specific memory device is output. For example, data PRE that has already been stored in the specific memory device may be read from the memory block 1251.

At time t3, the memory controller 1253 may generate a modified value. The modified value may be generated by adding the data PRE read from the memory block 1251 to the value received from the host 1100. The data PRE may fill the difference as much as the vacancy VCN. Accordingly, the modified value may have the ECC unit size, and the memory controller 1253 may generate a parity by performing ECC encoding on the modified value.

Afterwards, at time t4, the memory controller 1253 may transmit the column access signal and a write request signal (e.g., a write command) to a specific memory device. Accordingly, the memory controller 1253 may control the specific memory device such that the modified value is stored in the specific memory device.

According to the operation of FIG. 10, the memory controller 1253 may read the data PRE that was previously stored in the memory block 1251, to perform an ECC operation on the value received from the host 1100. The modified value including the data PRE has the ECC unit size, thus the memory controller 1253 may perform the ECC operation on the modified value. However, an additional (i.e., unnecessary) read operation may be performed at time t2, to generate the parity and to store the modified value. In addition, it may be checked whether an error exists in the data PRE read through the additional read operation, thereby causing an increase in a delay. The additional read operation may degrade the performance of the object storage 1250 and may cause unnecessary power consumption.

Figure 11:
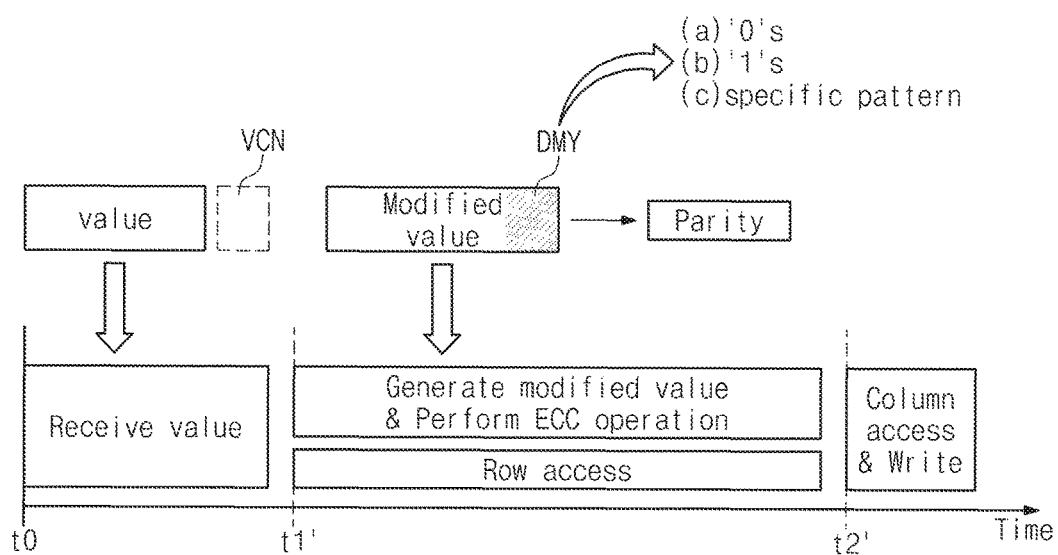
FIG. 11 is a conceptual diagram describing an example operation for adding dummy data to a value, to omit the read-modify-write operation in the object storage of FIG. 2.

FIG. 11 is a conceptual diagram describing an example operation for adding dummy data to a value, to omit a read-modify-write operation in the object storage of FIG. 2. To facilitate better understanding, FIG. 11 will be referred together with FIGS. 2 and 10.

At time t0, the memory controller 1253 may receive a value from the host 1100. For example, a size of the received value may be smaller than the ECC unit size. For example, a difference as much as a vacancy VCN may occur between the ECC unit size and the value size.

At time t1, the memory controller 1253 may generate a modified value. The modified value may be generated by adding dummy data DMY to the value received from the host 1100. The difference as much as the vacancy VCN may be filled with the dummy data DMY. The modified value may have the ECC unit size, and the memory controller 1253 may generate a parity by performing ECC encoding on the modified value.

For example, the dummy data DMY may include one or more logic "0"s. Alternatively, the dummy data DMY may include one or more logic "1"s. In some cases, the dummy data DMY may have a specific pattern. The dummy data DMY may be variously changed or modified such that the memory controller 1253 recognizes or comprehends the dummy data DMY.

Unlike the operation described with reference to FIG. 10, the operation of FIG. 11 may generate the modified value by using the dummy data DMY, instead of the data PRE previously stored in the memory block 1251. Accordingly, an additional read operation for reading the data PRE from the memory block 1251 may be omitted. According to the operation of FIG. 11, it may be possible to prevent the performance of the object storage 1250 from being degraded and to reduce unnecessary power consumption.

In addition, in some cases, the memory controller 1253 may transmit a row access signal to a specific memory device in the memory block 1251 while the modified value is generated and the ECC encoding is performed. The performance of the object storage 1250 may be further improved by transmitting the row access signal in parallel (e.g., concurrently or simultaneously) with generating the modified value. However, in some other cases, generating the modified value and transmitting the row access signal may be sequentially performed.

Afterwards, at time t2, the memory controller 1253 may transmit a column access signal and a write request signal to the specific memory device. Accordingly, the memory controller 1253 may control the specific memory device such that the modified value is stored in the specific memory device.

Figure 12:
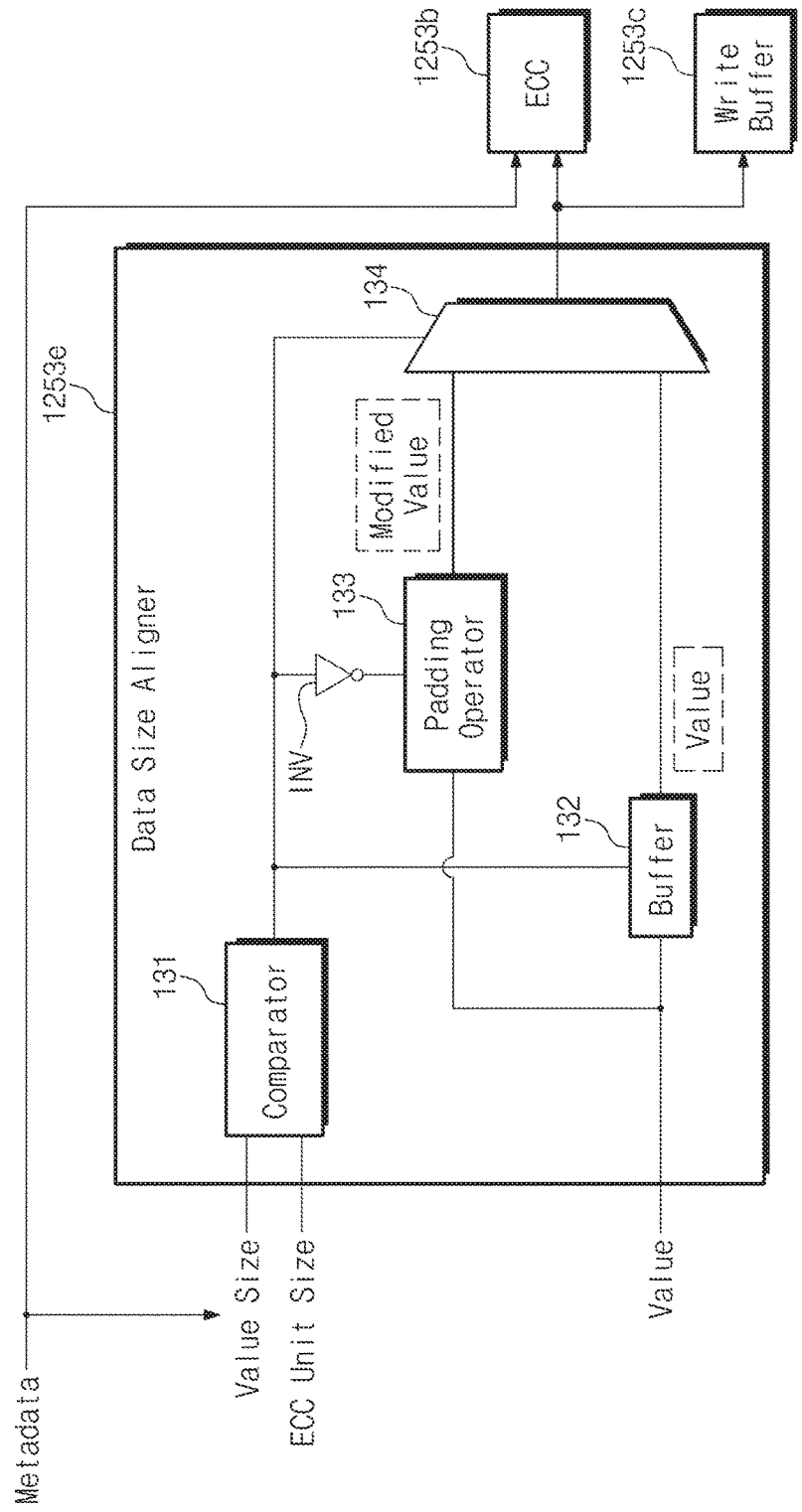
FIG. 12 is a block diagram illustrating an example configuration of the memory controller of FIG. 2 for adding dummy data to a value according to the example operation of FIG. 11.

FIG. 12 is a block diagram illustrating an example configuration of the memory controller of FIG. 2 for adding dummy data to a value according to the example operation of FIG. 11. To facilitate better understanding, FIG. 12 will be referred together with FIG. 2.

According to at least some example embodiments of the inventive concepts, the memory controller 1253 may further include a data size aligner 1253e that may perform a "padding" operation for adding dummy data to a value. According to at least some example embodiments of the inventive concepts, the data size aligner 1253e may include a comparator 131, a buffer 132, a padding operator 133, and an output selector 134.

As described above, the memory controller 1253 may receive a value and metadata from the host 1100. The comparator 131 may determine a size (hereinafter referred to as a "value size") of data corresponding to the value, based on the metadata. The comparator 131 may compare the value size with the ECC unit size.

The comparator 131 may output the comparison result. The comparison result may indicate that the value size is the same as the ECC unit size. Alternatively, the comparison result may indicate that the value size is different from (e.g., smaller than) the ECC unit size.

The buffer 132 may receive the value from the host 1100. The buffer 132 may buffer the received value. Afterwards, the buffer 132 may output the buffered value.

The padding operator 133 may receive the value from the host 1100. The padding operator 133 may add dummy data to the value. Accordingly, the padding operator 133 may output a modified value.

The buffer 132 and the padding operator 133 may operate in response to the comparison result of the comparator 131. The padding operator 133 and the buffer 132 may be complementary to each other in operation. For example, the data size aligner 1253e may include an inverter INV. In this example, the comparison result for operating the padding operator 133 may be different from the comparison result for operating the buffer 132.

For example, the padding operator 133 may operate when the comparison result of the comparator 131 indicates that the value size is smaller than the ECC unit size. When the value size is smaller than the ECC unit size, the padding operator 133 may add dummy data to the value such that the value has the ECC unit size. The padding operator 133 may generate the modified value by adding the dummy data to the value.

On the other hand, for example, the buffer 132 may operate when the comparison result of the comparator 131 indicates that the value size is identical to the ECC unit size. When the value size is the same as the ECC unit size, the buffer 132 may buffer the value. In this case, the padding operation may not be performed.

In response to the comparison result of the comparator 131, the output selector 134 may selectively output one of the value provided from the buffer 132 and the modified value provided from the padding operator 133. The output of the output selector 134 may be provided to the ECC processor 1253b and the write buffer 1253c of the memory controller 1253.

The ECC processor 1253b may perform ECC encoding on one of the value and the modified value received from the output selector 134, based on the metadata. For example, when the value size is smaller than the ECC unit size, the ECC processor 1253b may generate a parity for the modified value including the dummy data. On the other hand, when the value size is identical to the ECC unit size, the ECC processor 1253b may generate a parity for the value that does not include the dummy data.

The write buffer 1253c may buffer one of the value and the modified value received from the output selector 134. Data corresponding to the value buffered by the write buffer 1253c may be stored in memory devices of the memory block 1251. For example, when the value size is smaller than the ECC unit size, the memory devices may store data corresponding to the modified value including the dummy data. On the other hand, when the value size is the same as the ECC unit size, the memory devices may store data corresponding to the value that does not include the dummy data.

Figure 13:
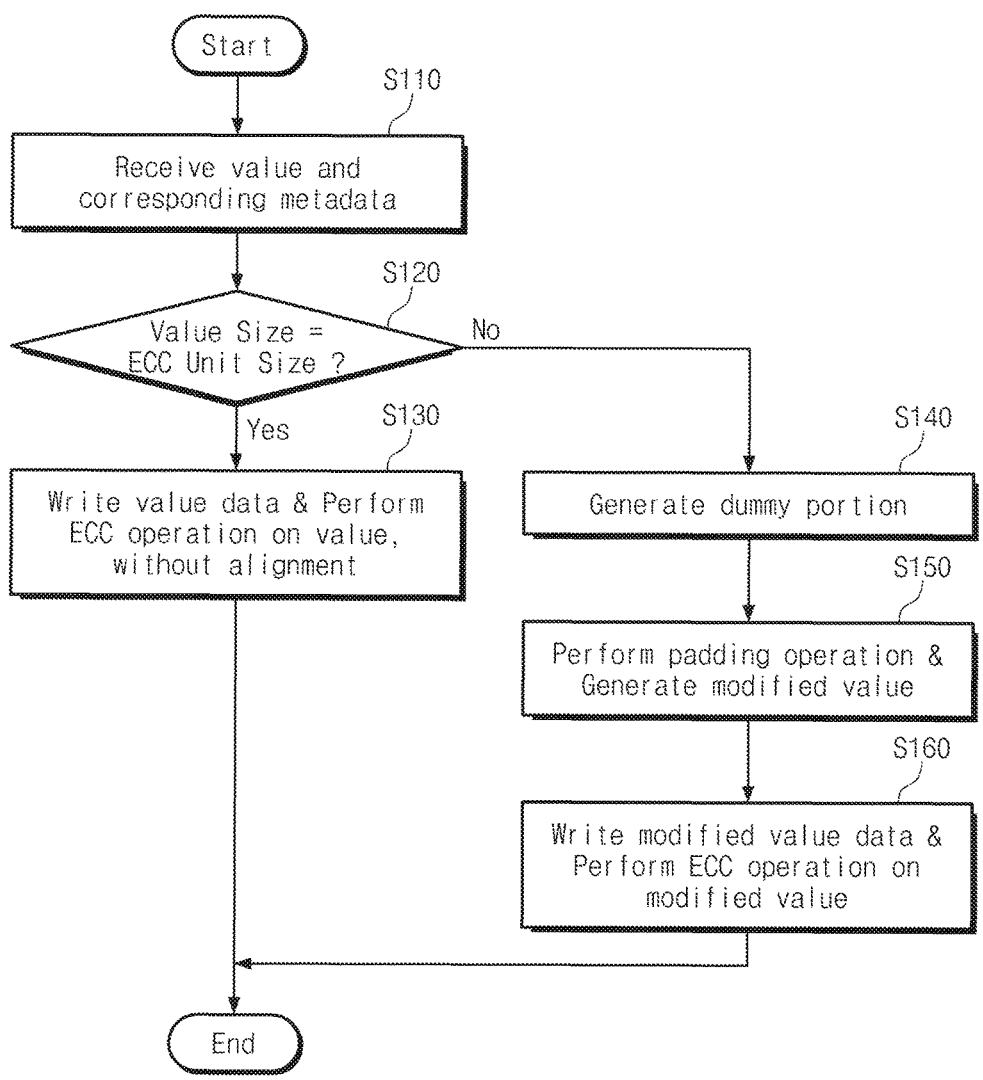
FIG. 13 is a flowchart describing an example operation of the object storage of FIG. 2 according to the example configuration of FIG. 12.

FIG. 13 is a flowchart describing an example operation of the object storage of FIG. 2 according to the example configuration of FIG. 12. To facilitate better understanding, FIG. 13 will be referred together with FIGS. 2 and 12.

In operation S110, the data size aligner 1253e of the memory controller 1253 may receive a value and metadata from the host 1100. In operation S120, the comparator 131 may compare a value size with the ECC unit size. The comparator 131 may determine the value size based on the metadata.

If the value size is the same as the ECC unit size, operation S130 may be performed. In operation S130, each of the ECC processor 1253b and the write buffer 1253c may receive the value buffered by the buffer 132 through the output selector 134. Each of the ECC processor 1253b and the write buffer 1253c may receive a value that does not include dummy data (i.e., a value that is not aligned). The write buffer 1253c may provide the received value to the memory block 1251. The ECC processor 1253b may generate a parity by performing ECC encoding on the received value.

On the other hand, when the value size is smaller than the ECC unit size, operation S140 may be performed. In operation S140, the padding operator 133 may prepare dummy data to be added to the value. In operation S150, the padding operator 133 may generate a modified value by adding the dummy data to the value. The modified value may have the ECC unit size.

Accordingly, in operation S160, each of the ECC processor 1253b and the write buffer 1253c may receive the modified value from the padding operator 133 through the output selector 134. Each of the ECC processor 1253b and the write buffer 1253c may receive a modified value that includes dummy data (i.e., a value that is aligned). The ECC processor 1253b may generate a parity by performing the ECC encoding on the modified value. In addition, the write buffer 1253c may provide the modified value to the memory block 1251 after buffering the modified value.

Figure 14:
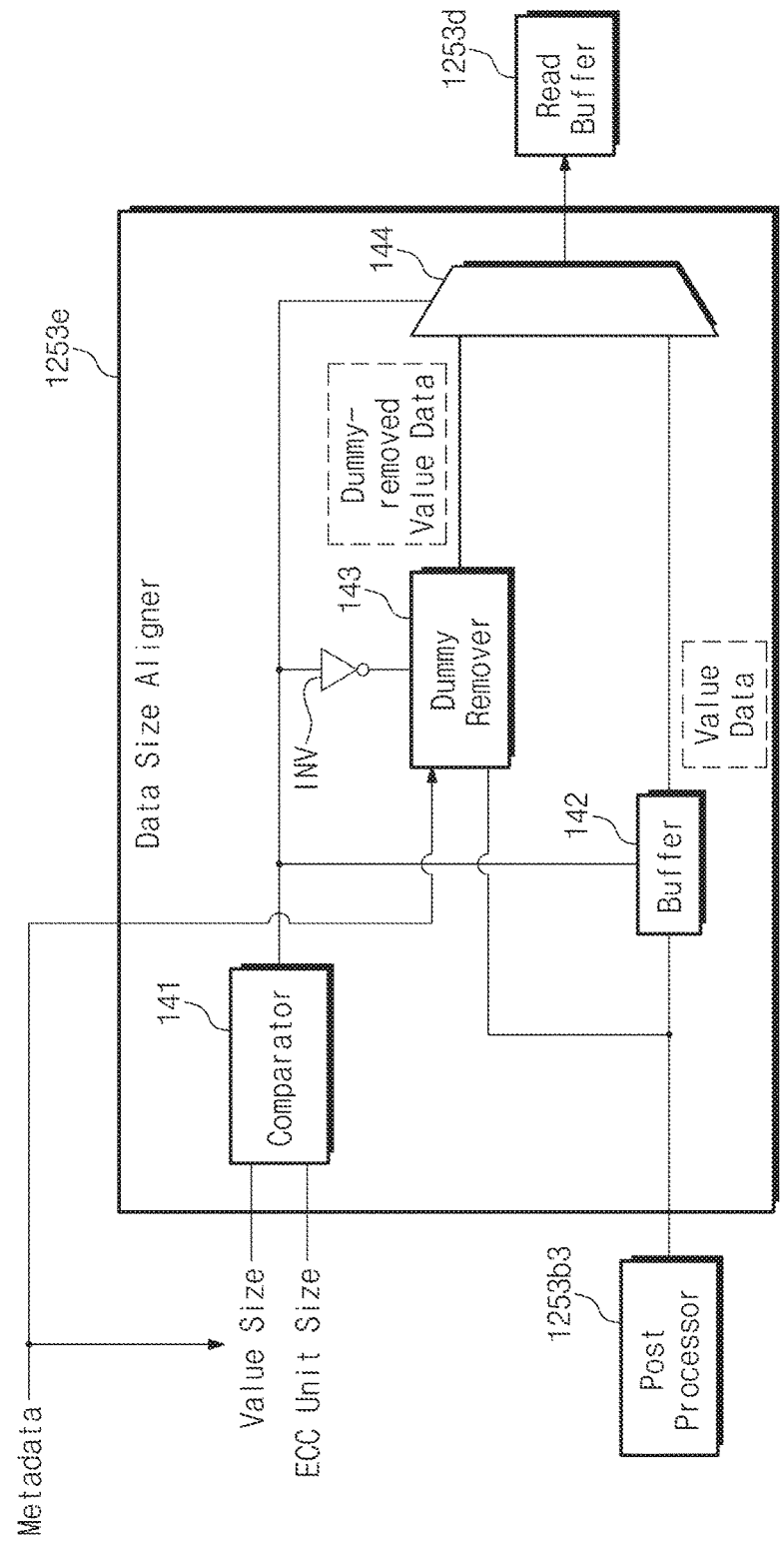
FIG. 14 is a block diagram illustrating an example configuration of the memory controller of FIG. 2 for removing dummy data added to value data according to the example operation of FIG. 11.

FIG. 14 is a block diagram illustrating an example configuration of the memory controller of FIG. 2 for removing dummy data added to value data according to the example operation of FIG. 11. To facilitate better understanding, FIG. 14 will be referred together with FIG. 2.

The data size aligner 1253e of the memory controller 1253 may not only add dummy data to a value, but also it may remove the dummy data added to value data. The dummy data may be added for an ECC operation regardless of an original value. Accordingly, the data size aligner 1253e may remove the dummy data to output a value requested by the host 1100.

According to at least some example embodiments of the inventive concepts, the data size aligner 1253e may include a comparator 141, a buffer 142, a dummy remover 143, and an output selector 144. The data size aligner 1253e may receive metadata managed in key-value mapping information. In addition, the data size aligner 1253e may receive value data from the post processor 1253b3.

The comparator 141 may determine a value size based on the metadata. The comparator 141 may compare the value size with the ECC unit size. The comparator 141 may output the comparison result. The comparison result may indicate that the value size is the same as the ECC unit size. Alternatively, the comparison result may indicate that the value size is different from (e.g., smaller than) the ECC unit size.

The buffer 142 may receive the value data from the post processor 1253b3. The buffer 142 may buffer the received value data. Afterwards, the buffer 142 may output the buffered value data.

The dummy remover 143 may receive the value data from the post processor 1253b3. When the dummy data was added to the value data, the dummy remover 143 may remove the dummy data from the value data. For example, the dummy remover 143 may determine a size of a meaningful data portion of the value data except for the dummy data, based on the metadata. Accordingly, the dummy remover 143 may identify a dummy portion. The dummy remover 143 may remove the dummy data of the identified dummy portion. Accordingly, the dummy remover 143 may generate dummy-removed value data, i.e., value data from which the dummy portion is removed.

The buffer 142 and the dummy remover 143 may operate in response to the comparison result of the comparator 141. The dummy remover 143 and the buffer 142 may be complementary to each other in operation. For example, the data size aligner 1253e may include an inverter INV. In this example, the comparison result for operating the dummy remover 143 may be different from the comparison result for operating the buffer 142.

For example, the dummy remover 143 may operate when the comparison result of the comparator 141 indicates that the value size is smaller than the ECC unit size. When the value size is smaller than the ECC unit size, the dummy remover 143 may remove the dummy data from the value data. On the other hand, the buffer 142 may operate when the comparison result of the comparator 141 indicates that the value size is identical to the ECC unit size. When the value size is the same as the ECC unit size, the buffer 142 may buffer the value data.

In response to the comparison result of the comparator 141, the output selector 144 may selectively output one of the value data provided from the buffer 142 and the dummy-removed value data provided from the dummy remover 143. The output of the output selector 144 may be provided to the read buffer 1253d of the memory controller 1253.

The read buffer 1253d may buffer one of the value data and the dummy-removed value data received from the output selector 144. The memory controller 1253 may output a value to the host 1100 based on the value data buffered by the read buffer 1253d. For example, when the value size is smaller than the ECC unit size, the memory controller 1253 may output the value to the host 1100 based on the dummy-removed value data. On the other hand, when the value size is the same as the ECC unit size, the memory controller 1253 may output the value to the host 1100 based on the value data provided from the buffer 142.

Figure 15:
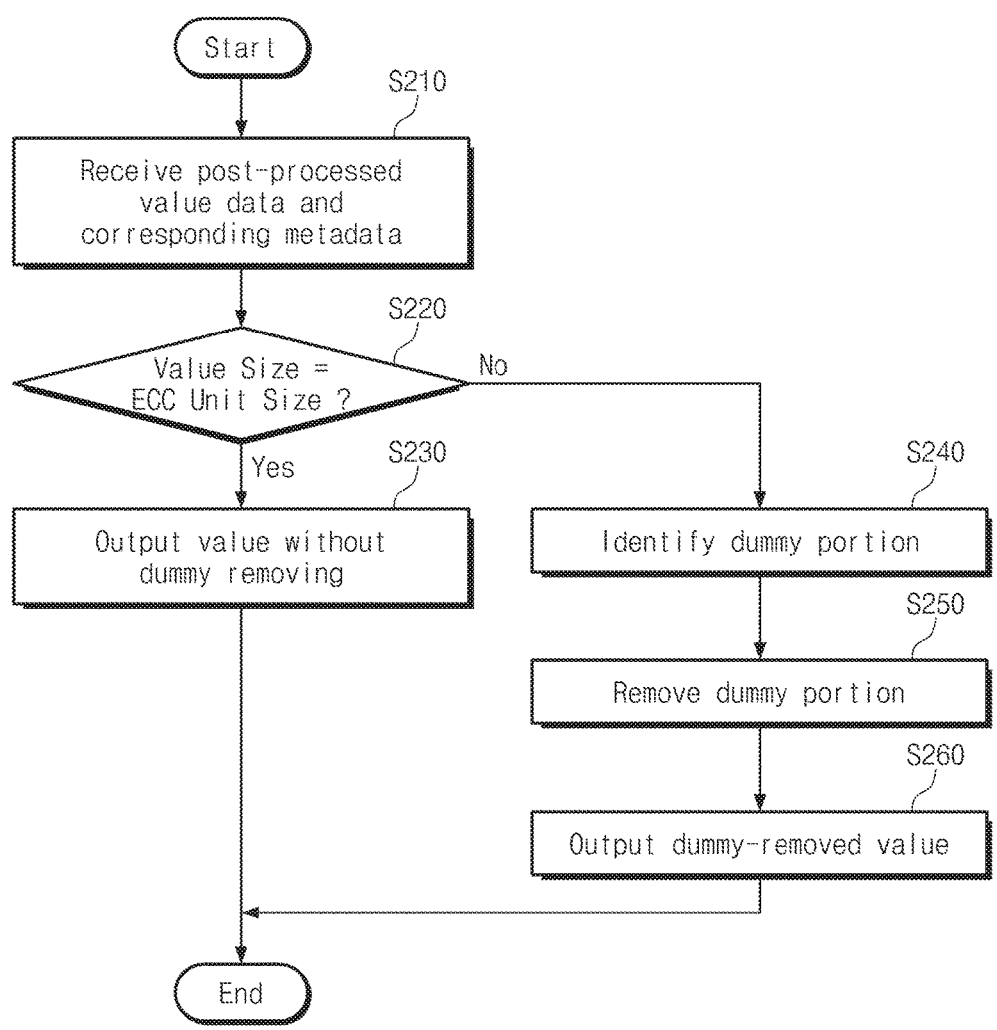
FIG. 15 is a flowchart describing an example operation of the object storage of FIG. 2 according to the example configuration of FIG. 14.

FIG. 15 is a flowchart describing an example operation of the object storage of FIG. 2 according to the example configuration of FIG. 14. To facilitate better understanding, FIG. 15 will be referred together with FIGS. 2 and 14.

In operation S210, the data size aligner 1253e of the memory controller 1253 may receive value data from the post processor 1253b3. In addition, the data size aligner 1253e may receive metadata managed in key-value mapping information. In operation S220, the comparator 141 may compare a value size with the ECC unit size. The comparator 141 may determine the value size based on the metadata.

When the value size is identical to the ECC unit size, operation S230 may be performed. In operation S230, the read buffer 1253d may receive the value data buffered by the buffer 142 through the output selector 144. Herein, the read buffer 1253d may receive value data that does not include a dummy portion. Accordingly, a process of removing the dummy data may not be performed. The read buffer 1253d may output a value to the host 1100 based on the value data.

On the other hand, when the value size is smaller than the ECC unit size, operation S240 may be performed. In operation S240, the dummy remover 143 may identify a dummy portion of the value data, based on the metadata. In operation S250, the dummy remover 143 may remove the dummy data of the identified dummy portion from the value data.

Accordingly, in operation S260, the read buffer 1253d may receive dummy-removed value data from the dummy remover 143 through the output selector 144. The read buffer 1253d may output a value to the host 1100 based on the dummy-removed value data.

Figure 16:
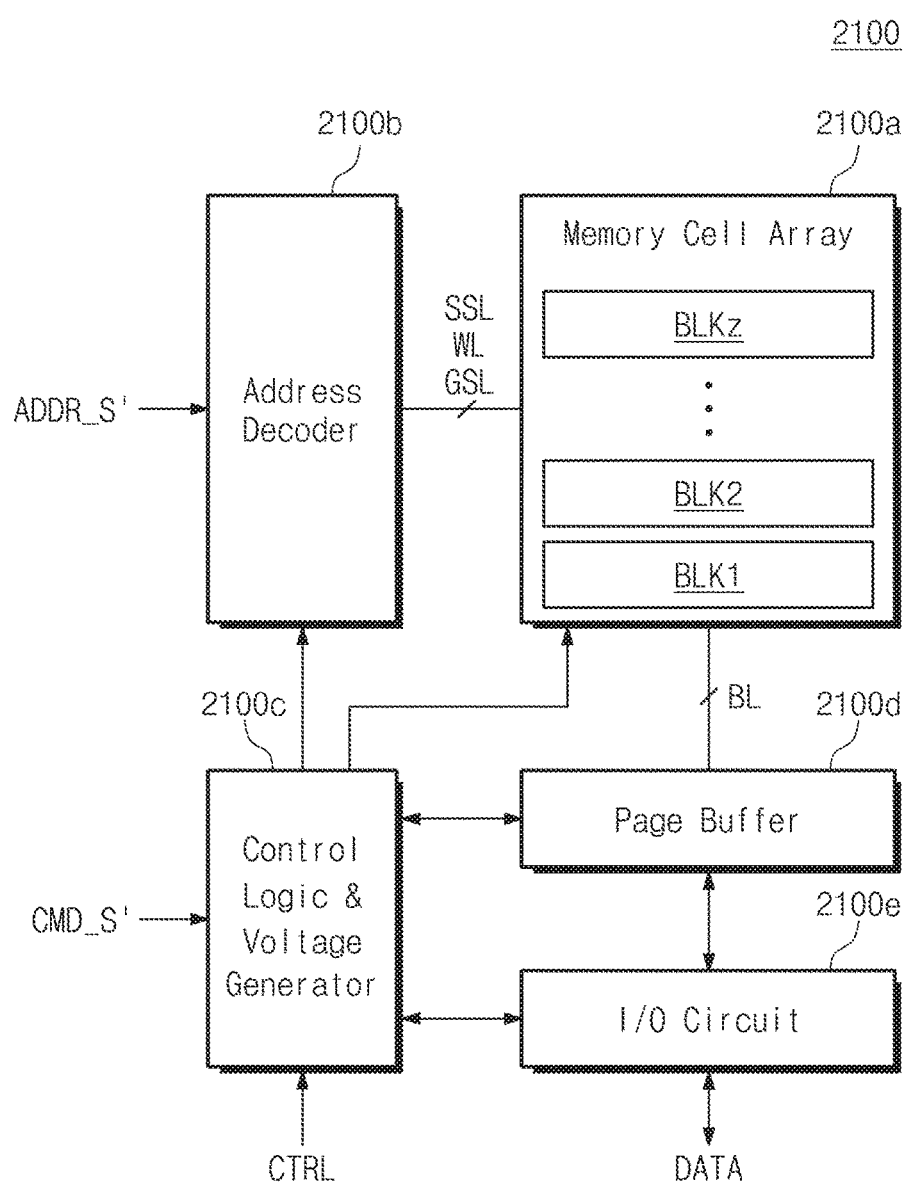
FIG. 16 is a block diagram illustrating a nonvolatile memory included in a nonvolatile memory-based storage of FIG. 1.

FIG. 16 is a block diagram illustrating a nonvolatile memory included in the nonvolatile memory-based storage of FIG. 1.

According to at least some example embodiments of the inventive concepts, the nonvolatile memory-based storage 1230 of FIG. 1 may include a storage such as an SSD including a semiconductor flash memory. In at least this example embodiment of the inventive concepts, the nonvolatile memory-based storage 1230 may include one or more nonvolatile memories to store data. In addition, the nonvolatile memory-based storage 1230 may include a memory controller to control an operation of the one or more nonvolatile memories.

For example, the nonvolatile memory included in the nonvolatile memory-based storage 1230 may include a nonvolatile memory 2100. The nonvolatile memory 2100 may include a memory cell array 2100a, an address decoder 2100b, a control logic and voltage generator 2100c, a page buffer 2100d, and an input/output circuit 2100e.

The memory cell array 2100a may include a plurality of memory blocks BLK1 to BLKz. Each of the memory blocks BLK1 to BLKz may include a plurality of cell strings. Each of the cell strings may include a plurality of memory cells. The memory cells may be connected with a plurality of word lines WLs respectively. Each memory cell may include a single level cell (SLC) storing one bit or a multi-level cell (MLC) storing at least two bits.

According to at least some example embodiments of the inventive concepts, the memory cell array 2100a may include a three-dimensional (3-D) memory array. The 3-D memory array may be monolithically formed in one or more physical levels of a memory cell array having an active area arranged on a silicon substrate and a circuit related to operations of memory cells. The circuitry related to the operations of memory cells may be located inside or on the substrate. The term "monolithically" may mean that a layer of each level of the 3-D memory array is directly deposited on layer(s) of respective underlying level(s) of the 3-D memory array.

According to at least some example embodiments of the inventive concepts, the 3-D memory array may include vertical NAND strings that are vertically oriented such that at least one memory cell is located on other memory cell(s). The at least one memory cell may include a charge trap layer. Each vertical NAND string may include at least one selection transistor located on memory cells. At least one selection transistor may have the same structure as memory cells, and be monolithically formed together with the memory cells.

The following patent documents, which are incorporated herein by reference, describe suitable configurations for a 3-D memory array, in which the 3-D memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The address decoder 2100b may be connected with the memory cell array 2100a through the word lines WLs, string selection lines SSLs, and ground selection lines GSLs. The address decoder 2100b may receive and decode an address ADDR_S' from the memory controller. The address decoder 2100b may select at least one of the word lines WLs based on the decoded address ADDR_S', and may drive the at least one selected word line.

The control logic and voltage generator 2100c may receive a command CMD_S' and a control signal CTRL from the memory controller. The control logic and voltage generator 2100c may control the address decoder 2100b, the page buffer 2100d, and the input/output circuit 2100e in response to the received signals. For example, in response to the command CMD_S' and the control signal CTRL, the control logic and voltage generator 2100c may control the address decoder 2100b, the page buffer 2100d, and the input/output circuit 2100e such that write data DATA provided from the memory controller is stored in the memory cell array 2100a or such that the stored data DATA is read from the memory cell array 2100a.

The control logic and voltage generator 2100c may generate various voltages used to operate the nonvolatile memory 2100. For example, the control logic and voltage generator 2100c may generate a plurality of program voltages, a plurality of pass voltages, a plurality of selection read voltages, a plurality of non-selection read voltages, a plurality of erase voltages, and a plurality of verification voltages. The control logic and voltage generator 2100c may provide the generated voltages to the address decoder 2100b and/or to a substrate of the memory cell array 2100a.

The page buffer 2100d may be connected with the memory cell array 2100a through the bit lines BLs. Under control of the control logic and voltage generator 2100c, the page buffer 2100d may control the bit lines BLs such that write data DATA provided from the input/output circuit 2100e is stored in the memory cell array 2100a. Under control of the control logic and voltage generator 2100c, the page buffer 2100d may read data stored in the memory cell array 2100a and may provide the read data to the input/output circuit 2100e. For example, the page buffer 2100d may receive data from the input/output circuit 2100e in units of pages, or may read data from the memory cell array 2100a in units of pages. According to at least some example embodiments of the inventive concepts, the page buffer 2100d may include data latches for temporarily storing data read from the memory cell array 2100a and/or data provided from the input/output circuit 2100e.

The input/output circuit 2100e may receive write data DATA from an external device such as the memory controller, and may provide the write data DATA to the page buffer 2100d. The input/output circuit 2100e may receive read data DATA from the page buffer 2100d, and may provide the read data DATA to the external device such as the memory controller. For example, the input/output circuit 2100e may exchange data DATA with the external device in synchronization with the control signal CTRL.

Figure 17:
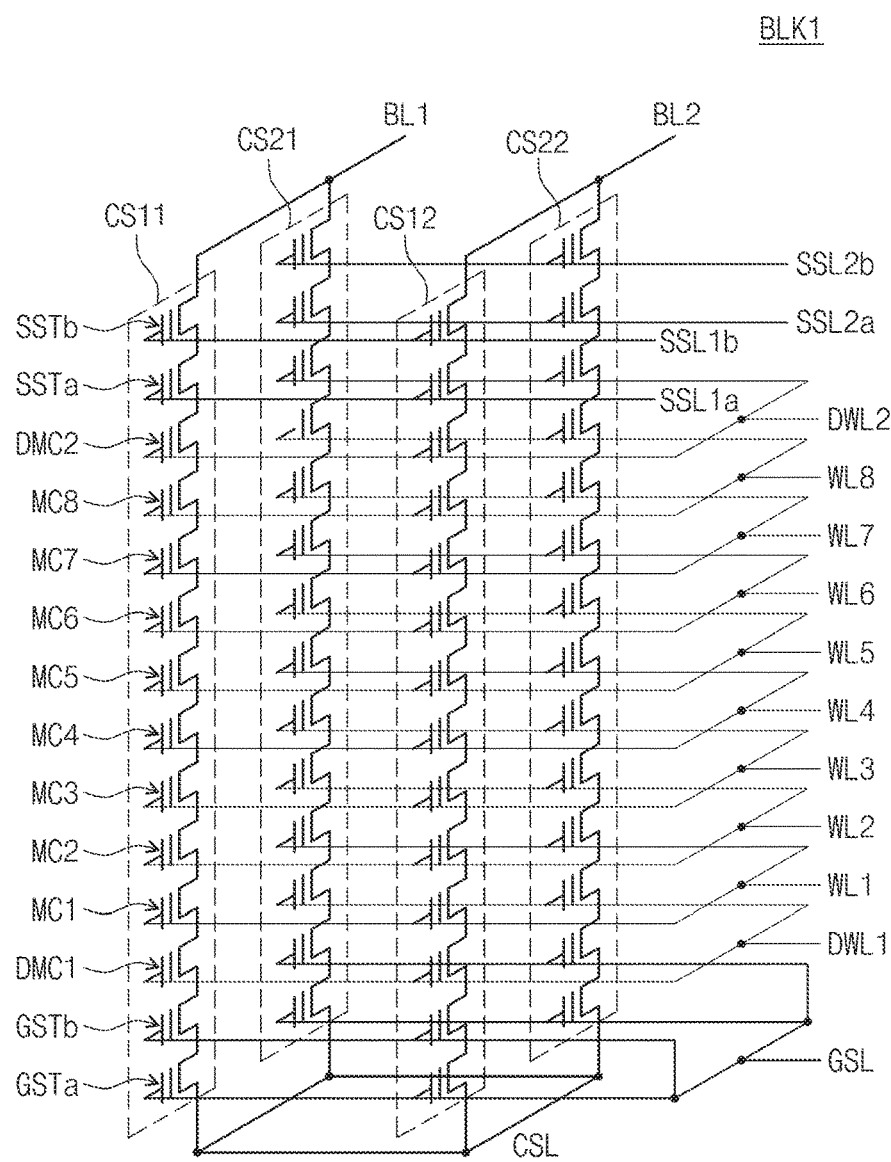
FIG. 17 is a conceptual diagram illustrating one memory block of a memory cell array of FIG. 16.
Figure 17:
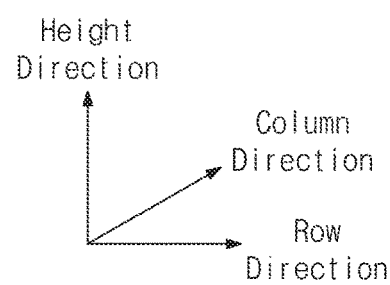

FIG. 17 is a conceptual diagram illustrating one memory block of the memory cell array of FIG. 16. A first memory block BLK1 having a 3-D structure will be described with reference to FIG. 17. FIG. 17 illustrates that the memory cell array 2100a of FIG. 16 includes a NAND flash memory. However, at least some example embodiments of the inventive concepts are not limited thereto. Other memory blocks may be configured substantially the same as the first memory block BLK1.

The first memory block BLK1 may include a plurality of cell strings CS11, CS12, CS21, and CS22. The cell strings CS11, CS12, CS21, and CS22 may be arranged along a row direction and a column direction to constitute rows and columns. For example, the cell strings CS11 and CS12 may be connected to string selection lines SSL1a and SSL1b to constitute a first row. The cell strings CS21 and CS22 may be connected to string selection lines SSL2a and SSL2b to constitute a second row. For example, the cell strings CS11 and CS21 may be connected to a first bit line BL1 to constitute a first column. The cell strings CS12 and CS22 may be connected to a second bit line BL2 to constitute a second column.

Each of the cell strings CS11, CS12, CS21, and CS22 may include a plurality of cell transistors. Each of the cell strings CS1, CS12, CS21, and CS22 may include string selection transistors SSTa and SSTb, a plurality of memory cells MC1 to MC8, ground selection transistors GSTa and GSTb, and dummy memory cells DMC1 and DMC2. According to at least some example embodiments of the inventive concepts, each of the cell transistors included in the cell strings CS11, CS12, CS21, and CS22 may be a charge trap flash (CTF) memory cell.

The memory cells MC1 to MC8 may be serially connected to each other and may be stacked in a height direction that is perpendicular to a plane defined by the row direction and the column direction. In each cell string, the string selection transistors SSTa and SSTb may be serially connected to each other and may be arranged between the memory cells MC1 to MC8 and a bit line BL. In each cell string, the ground selection transistors GSTa and GSTb may be serially connected to each other and may be arranged between the memory cells MC1 to MC8 and a common source line CSL.

According to at least some example embodiments of the inventive concepts, in each cell string, a first dummy memory cell DMC1 may be arranged between the memory cells MC1 to MC8 and the ground selection transistors GSTa and GSTb. According to at least some example embodiments of the inventive concepts, in each cell string, a second dummy memory cell DMC2 may be arranged between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL. According to at least some example embodiments of the inventive concepts, ground selection transistors in the same row may be connected to the same ground selection line, and ground selection transistors in different rows may be connected to different ground selection lines. For example, the first ground selection transistors GSTa of the cell strings CS11 and CS12 in the first row may be connected to the first ground selection line, and the first ground selection transistors GSTa of the cell strings CS21 and CS22 in the second row may be connected to the second ground selection line.

In at least some example embodiments of the inventive concepts, although not illustrated, ground selection transistors disposed at the same height from a substrate (not shown) may be connected to the same ground selection line, and ground selection transistors disposed at different heights from the substrate may be connected to different ground selection lines. For example, the ground selection transistors GSTa of the cell strings CS11, CS12, CS21, and CS22 may be connected to the first ground selection line, and the ground selection transistors GSTb thereof may be connected to the second ground selection line.

Memory cells placed at the same height from the substrate (or the ground selection transistors GSTa and GSTb) may be connected in common to the same word line, and memory cells placed at different heights from the substrate (or the ground selection transistors GSTa and GSTb) may be connected to different word lines. For example, the memory cells MC1 to MC8 of the cell strings CS11, CS12, CS21, and CS22 may be connected in common to first to eighth word lines WL1 to WL8 respectively.

String selection transistors in the same row among the first string selection transistors SSTa placed at the same height may be connected to the same string selection line, and string selection transistors in different rows may be connected to different string selection lines. For example, the first string selection transistors SSTa of the cell strings CS11 and CS12 in the first row may be connected in common to a string selection line SSL1a, and the first string selection transistors SSTa of the cell strings CS21 and CS22 in the second row may be connected in common to a string selection line SSL2a.

Similarly, string selection transistors in the same row among the second string selection transistors SSTb placed at the same height may be connected to the same string selection line, and string selection transistors in different rows may be connected to different string selection lines. For example, the second string selection transistors SSTb of the cell strings CS11 and CS12 in the first row may be connected in common to a string selection line SSL1b, and the second string selection transistors SSTb of the cell strings CS21 and CS22 in the second row may be connected in common to a string selection line SSL2b.

Although not illustrated, string selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

According to at least some example embodiments of the inventive concepts, dummy memory cells at the same height may be connected with the same dummy word line, and dummy memory cells at different heights may be connected with different dummy word lines. For example, the first dummy memory cells DMC1 may be connected to a first dummy word line DWL1, and the second dummy memory cells DMC2 may be connected to a second dummy word line DWL2.

In the first memory block BLK1, read and write operations may be performed in units of rows. For example, one row of the first memory block BLK1 may be selected by the string selection lines SSL1a, SSL1b, SSL2a, and SSL2b.

The cell strings CS11 and CS12 in the first row may be respectively connected to the bit lines BL1 and BL2 when a turn-on voltage is supplied to the string selection lines SSL1a and SSL1b and a turn-off voltage is supplied to the string selection lines SSL2a and SSL2b. On the other hand, the cell strings CS21 and CS22 in the second row may be respectively connected to the bit lines BL1 and BL2 when the turn-on voltage is supplied to the string selection lines SSL2a and SSL2b and the turn-off voltage is supplied to the string selection lines SSL1a and SSL1b. When a word line is driven, memory cells, which are placed at the same height, from among memory cells in cell strings connected to the driven word line may be selected. Read and write operations may be performed with respect to the selected memory cells. The selected memory cells may constitute a physical page unit.

In the memory block BLK1, memory cells may be erased in units of memory blocks or sub-blocks. When erasing is performed in units of memory blocks, all memory cells MC1 to MC8 in the first memory block BLK1 may be simultaneously erased according to one erase request. When erasing is performed in units of sub-blocks, some of memory cells MC1 to MC8 in the first memory block BLK1 may be simultaneously erased according to one erase request, and the remaining memory cells may be erase-inhibited. A low voltage (e.g., a ground voltage) may be supplied to a word line connected to erased memory cells, and a word line connected to erase-inhibited memory cells may be floated.

A configuration of the first memory block BLK1 illustrated in FIG. 17 may be just an example. The number of cell strings may increase or decrease, and the number of rows and columns of the cell strings may increase or decrease according to the number of the cell strings. In addition, in the first memory block BLK1, the number of cell transistors (GST, MC, DMC, SST, etc.) may increase or decrease, and height of the first memory block BLK1 may increase or decrease according to the number of the cell transistors. Further, the number of lines (GSL, WL, DWL, SSL, etc.) connected with the cell transistors may increase or decrease according to the number of the cell transistors.

According to at least some example embodiments of the inventive concepts, it may be possible to reduce costs of manufacturing an object storage and to manage data efficiently. In addition, the operation performance of the object storage may be improved, and power consumption of the object storage may decrease.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An object storage system comprising:
a plurality of memory devices; and
a memory controller configured to,
receive a value and a key from a host, the key identifying the received value,
store data corresponding to the received value in the plurality of memory devices,
generate, based on the received value, a parity for detecting an error of the stored data,
manage key-value mapping information that identifies a correspondence relationship between the received value and the key, and
manage the parity in the key-value mapping information such that the parity corresponds to the received value and the key.

2. The object storage system of claim 1 wherein, the memory controller is further configured to store the parity separately from the data.

3. The object storage system of claim 1 wherein, the plurality of memory devices does not include a memory device that is configured to store only the parity and other information for detecting the error of the stored data.

4. The object storage system of claim 1 wherein,
the memory controller is further configured to,
generate a hash by performing a hash operation on the received key, and
include the generated hash in the key-value mapping information as data corresponding to the key, and
the key-value mapping information identifies a correspondence relationship between the hash, the parity, and an address of a memory area in the plurality of memory devices storing the stored data.

5. The object storage system of claim 1 wherein,
the memory controller is further configured to receive metadata of the received value from the host,
the memory controller comprises:
a plurality of error correction code (ECC) encoders; and
an ECC selector configured to selectively operate one of the plurality of ECC encoders based on the metadata, and
the memory controller is further configured to select, from among the plurality of ECC encoders, an ECC encoder that is to generate the parity based on the received value.

6. The object storage system of claim 5 wherein,
ECC encoders among the plurality of ECC encoders have different capabilities with respect to error detection and/or correction, and
the ECC selector is further configured to,
determine a size of the data corresponding to the received value based on the metadata, and
select one ECC encoder, from among the plurality of ECC encoders, that has an error detection and/or correction capability that corresponds to the determined size.

7. The object storage system of claim 1 wherein,
the memory controller is further configured to generate a modified value by adding dummy data to the received value such that a size of the modified value is an ECC unit size of the memory controller.

8. The object storage system of claim 7 wherein,
the memory controller comprises:
a padding operator configured to generate the modified value by adding the dummy data to the received value, when a size of the received value is smaller than the ECC unit size.

9. The object storage system of claim 8 wherein,
the memory controller is configured to generate the parity based on the modified value, and
the stored data includes the modified value.

10. The object storage system of claim 8 wherein,
when the size of the received value is identical to the ECC unit size, the memory controller is configured to generate the parity based on the received value, and
the stored data includes the received value.

11. An object storage system comprising:
a plurality of memory devices configured to store data that corresponds to a value; and
a memory controller configured to,
manage key-value mapping information that identifies a correspondence relationship between the value, a first key and a parity,
receive a key from a host,
determine that the received key corresponds to the first key, based on the determination, read, from the plurality of memory devices, the data that corresponds to the value that is identified by the key-value mapping information as having the correspondence relationship with the first key, and output the value to the host based on the read data, wherein the memory controller is further configured to detect an error of the read data based on the parity that is identified by the key-value mapping information as having the correspondence relationship with the value and the first key.

12. The object storage system of claim 11 wherein, the memory controller is further configured to,
manage the key-value mapping information such that the key-value mapping information identifies a correspondence relationship between the value, the first key, the parity, and metadata, and
detect the error of the read data by using the parity together with the metadata.

13. The object storage system of claim 11 wherein, the memory controller comprises:
a plurality of ECC decoders; and
an ECC selector configured to selectively operate one of the plurality of ECC decoders based on metadata for the read data, and
the memory controller is further configured to select, from among the plurality of ECC decoders, an ECC decoder that is to detect the error of the read data based on the parity.

14. The object storage system of claim 13 wherein, ECC decoders among the plurality of ECC decoders have different capabilities with respect to error detection and/or correction, and
the ECC selector is further configured to,
determine a size of the read data based on the metadata, and
select one ECC decoder, from among the plurality of ECC decoders, that has an error detection and/or correction capability that corresponds to the determined size.

15. The object storage system of claim 11 wherein, the memory controller is further configured to remove dummy data from the read data, based on metadata for the value.

16. The object storage system of claim 15 wherein, the memory controller comprises:
a dummy remover configured to generate dummy-removed value data by removing the dummy data from the read data, when the size of the value is smaller than an ECC unit size.

17. The object storage system of claim 16 wherein, the memory controller is further configured to output the value to the host based on the dummy-removed value data.

18. The object storage system of claim 16 wherein, when the size of the value is identical to the ECC unit size, the memory controller is further configured to output the value to the host based on the read data.

19. A memory system comprising:
one or more memory devices; and
a memory controller configured to,
generate a table that,
includes a first key identifying value data,
includes a storage address of the value data within the one or more memory devices,
includes parity data for performing error detection for the value data, and
maps the first key to the storage address and the parity data, receive a key from a host, and
when the received key corresponds to the first key,
read the value data from the one or more memory devices using the storage address,
perform the error detection on the read value data using the parity data, and
output the read value data to the host.

20. The memory system of claim 19 wherein, the memory controller is further configured to,
generate the table such that the table further includes metadata of the value data,
determine a size of the read value data based on the metadata, and
perform error correction on the read value data with an error correction capability that corresponds to the determined size, when an error of the read value data is detected in response to the error detection.

* * * * *